(12) United States Patent
Hirooka et al.

(10) Patent No.: US 11,795,884 B2
(45) Date of Patent: Oct. 24, 2023

(54) CONTROL DEVICE FOR INTERNAL COMBUSTION ENGINE

(71) Applicant: TOYOTA JIDOSHA KABUSHIKI KAISHA, Toyota (JP)

(72) Inventors: Shigemasa Hirooka, Susono (JP); Koichi Kitaura, Odawara (JP); Yoshio Yamashita, Susono (JP); Shingo Korenaga, Nagoya (JP); Katsuhiro Ito, Nagoya (JP); Hikaru Shiozawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/897,594

(22) Filed: Aug. 29, 2022

(65) Prior Publication Data

US 2023/0094717 A1 Mar. 30, 2023

(30) Foreign Application Priority Data

Sep. 29, 2021 (JP) ................................. 2021-158973

(51) Int. Cl.
| | |
|---|---|
| *F02D 41/02* | (2006.01) |
| *F02D 41/30* | (2006.01) |
| *F01N 3/10* | (2006.01) |
| *F01N 3/20* | (2006.01) |

(52) U.S. Cl.
CPC ......... *F02D 41/0235* (2013.01); *F01N 3/108* (2013.01); *F01N 3/2026* (2013.01); *F02D 41/3076* (2013.01)

(58) Field of Classification Search
CPC .. F02D 41/0235; F02D 41/3076; F01N 3/108; F01N 3/2026
See application file for complete search history.

(56) References Cited

U.S. PATENT DOCUMENTS

| | | | | |
|---|---|---|---|---|
| 8,661,796 B2* | 3/2014 | Yoshioka | ................ | F01N 11/00 60/300 |
| 9,206,728 B2* | 12/2015 | Tanaka | .................. | F01N 3/2026 |
| 9,347,353 B2* | 5/2016 | Yoshioka | .............. | F01N 3/2013 |

(Continued)

FOREIGN PATENT DOCUMENTS

JP 2011-231710 A 11/2011

*Primary Examiner* — Jesse S Bogue
(74) *Attorney, Agent, or Firm* — Oblon, McClelland, Maier & Neustadt, L.L.P.

(57) ABSTRACT

A control device is applied to an internal combustion engine equipped with an electric heating catalyst system provided with an EHC. The control device executes a preheating process to warm up an exhaust gas reduction catalyst prior to a start of the internal combustion engine by supplying electric power to the EHC, when the control device determines that a temperature of the exhaust gas reduction catalyst is lower than an activation temperature. The control device executes a determination process for determining whether water is adhered to a catalyst carrier. The control device starts the internal combustion engine without executing the preheating process when the control device determines by the determination process that water is adhered to the catalyst carrier, even when the control device determines that the temperature of the exhaust gas reduction catalyst is lower than the activation temperature.

7 Claims, 10 Drawing Sheets

(56) References Cited

U.S. PATENT DOCUMENTS

| | | | |
|---|---|---|---|
| 10,895,187 B2* | 1/2021 | Hirooka | F01N 9/00 |
| 11,293,326 B2* | 4/2022 | Hirooka | F01N 11/00 |
| 2003/0172646 A1* | 9/2003 | Hiratsuka | F01N 3/32 |
| | | | 60/309 |
| 2011/0265460 A1* | 11/2011 | Hirai | F01N 3/101 |
| | | | 60/300 |
| 2012/0004801 A1* | 1/2012 | Watanabe | F01N 11/00 |
| | | | 903/903 |
| 2013/0025267 A1* | 1/2013 | Yoshioka | F01N 3/2026 |
| | | | 60/309 |
| 2020/0072105 A1* | 3/2020 | Korenaga | F01N 3/2026 |
| 2021/0231068 A1* | 7/2021 | Kuno | F02D 41/0235 |

\* cited by examiner

CONTROL DEVICE FOR INTERNAL COMBUSTION ENGINE

CROSS-REFERENCE TO RELATED APPLICATION

This application claims priority to Japanese Patent Application No. 2021-158973 filed on Sep. 29, 2021, incorporated herein by reference in its entirety.

BACKGROUND

1. Technical Field

The present disclosure relates to a control device for an internal combustion engine.

2. Description of Related Art

An exhaust gas reduction catalyst that reduces exhaust gas of the internal combustion engine exhibits sufficient capacity at an activation temperature. Thus, when the temperature of the exhaust gas reduction catalyst is lower than the activation temperature, such as during a cold start, the exhaust gas may not be sufficiently reduced.

Of the exhaust gas reduction catalyst provided in an exhaust passage of an internal combustion engine, there is known an electric heating catalyst having a function of a heater that generates heat by being supplied with electric power. With the electric heating catalyst, it is possible to perform a preheating process for warming up the exhaust gas reduction catalyst by supplying electric power before starting the internal combustion engine.

A catalyst carrier of the electric heating catalyst is made of a material such as ceramic, which generates electric resistance and thus generates heat when energized. Japanese Unexamined Patent Application Publication No. 2011-231710 (JP 2011-231710 A) describes a problem that when the preheating process is performed in a state where micropores of the porous ceramic carrier contain water, a bumping phenomenon occurs in which the water expands thermally without escape.

In a control device disclosed in JP 2011-231710 A, when it is determined that the ceramic carrier contains water, low electric power control is performed to reduce the supplied electric power amount in order to avoid damage to the ceramic carrier due to the bumping phenomenon. JP 2011-231710 A describes that by performing the low electric power control in this way, the water inside the ceramic carrier can be slowly and gradually evaporated, so that damage due to the bumping phenomenon can be suppressed.

SUMMARY

When the preheating process is performed with water adhered to the catalyst carrier, heat is taken away by the latent heat of vaporization until the water evaporates and disappears. The temperature of the portion to which water is adhered therefore does not easily rise. On the other hand, the temperature of the portion to which water is not adhered continues to rise due to the heat generated by the energization during that period. Accordingly, when energization is continued, the temperature difference between the portion to which water is adhered and the portion to which water is not adhered increases, and thermal stress acts. For this reason, even if the low electric power control disclosed in JP 2011-231710 A is performed, the generation of thermal stress due to the temperature difference between the portion to which water is adhered and the portion to which water is not adhered cannot be sufficiently suppressed. As a result, the catalyst carrier may crack.

Hereinafter, means for solving the above problem and its operations and effects will be described.

A control device for an internal combustion engine for solving the above problems is applied to an internal combustion engine equipped with an electric heating catalyst system provided with an electric heating catalyst in which a catalyst carrier is heated by energizing the catalyst carrier, the electric heating catalyst being an exhaust gas reduction catalyst in which a catalyst is supported on the catalyst carrier that generates heat by energization. The control device is a control device that executes a preheating process to warm up the exhaust gas reduction catalyst prior to a start of the internal combustion engine by controlling a power supply device to supply electric power to the electric heating catalyst, when the control device determines that a temperature of the exhaust gas reduction catalyst is lower than an activation temperature. Further, the control device executes a determination process for determining whether water is adhered to the catalyst carrier, and starts the internal combustion engine without executing the preheating process when the control device determines by the determination process that water is adhered to the catalyst carrier, even when the control device determines that the temperature of the exhaust gas reduction catalyst is lower than the activation temperature.

In the case of the preheating process in which the catalyst carrier is heated by energization, heat is transferred from the catalyst carrier to the water adhering to the catalyst carrier. In addition, when the internal combustion engine is operating and the exhaust gas is passing through the exhaust gas reduction catalyst, heat is also applied to the water adhering to the catalyst carrier from the exhaust gas flowing around. The water therefore evaporates quickly. The catalyst carrier is also warmed by the heat of the exhaust gas. Therefore, the temperature difference between the portion to which water is adhered and the portion to which water is not adhered is less likely to occur as compared with the case where the preheating process is performed in which the catalyst carrier is heated only by energization. That is, according to the above configuration, the thermal stress generated in the catalyst carrier can be suppressed. As a result, it is possible to suppress the catalyst carrier from cracking due to thermal stress.

In an aspect of the control device, when the control device determines by the determination process that water is adhered to the catalyst carrier, the control device prohibits energization of the catalyst carrier. According to the above configuration, energization is not performed in a state where water may be adhered to the catalyst carrier. Therefore, it is possible to suppress the catalyst carrier from cracking due to thermal stress generated by energization.

In an aspect of the control device, the control device starts the internal combustion engine without executing the preheating process, and then energizes the catalyst carrier based on a determination by the determination process that water is adhered to the catalyst carrier.

As described above, when the internal combustion engine is in operation and the exhaust gas is passing through the catalyst carrier, heat is also applied to the water adhering to the catalyst carrier from the exhaust gas, which makes it easier for the water to evaporate. Therefore, cracking of the catalyst carrier due to thermal stress is less likely to occur. Thus, in the above configuration, after the internal combustion engine is started without executing the preheating process, the catalyst carrier is energized while the internal combustion engine is operated. Accordingly, the warm-up of the exhaust gas reduction catalyst can be completed quickly while suppressing the cracking of the catalyst carrier.

In an aspect of the control device, when the internal combustion engine is started without executing the preheating process based on a determination by the determination process that water is adhered to the catalyst carrier, the control device retards an ignition timing compared to when the internal combustion engine is started after executing the preheating process.

By performing engine operation with the retarded ignition timing, the exhaust temperature increases. Therefore, according to the above configuration, the temperature of the exhaust gas passing through the catalyst carrier can be raised, and the removal of water and the warming up of the exhaust gas reduction catalyst can be completed promptly.

In an aspect of the control device, when the internal combustion engine is started without executing the preheating process based on a determination by the determination process that water is adhered to the catalyst carrier, the control device increases a fuel injection amount compared to when the internal combustion engine is started after executing the preheating process.

As the fuel injection amount increases, the engine rotation speed increases and the flow rate of the exhaust gas passing through the catalyst carrier increases, and the heat generated by combustion increases. Accordingly, the amount of heat applied to the water adhering to the catalyst carrier and the catalyst carrier per unit time increases, so that it is possible to quickly complete the removal of water and the warming up of the exhaust gas reduction catalyst.

In an aspect of the control device, the control device calculates water content that is an amount of water contained in the catalyst carrier, and in the determination process, the control device determines that water is adhered to the catalyst carrier when the calculated water content is equal to or larger than a threshold value, and determines that water is not adhered to the catalyst carrier when the calculated water content is smaller than the threshold value.

The determination on whether water is adhered to the catalyst carrier can be made based on the magnitude of the calculated value of water content as in the above configuration. In an aspect of the control device, the control device calculates a generated amount that is an amount of water generated in the catalyst carrier while the internal combustion engine is stopped, and an evaporation amount that is an amount of water that evaporates in the catalyst carrier while the internal combustion engine is operating and an amount of water that evaporates in the catalyst carrier due to energization of the catalyst carrier. The control device then calculates the water content based on the generated amount and the evaporation amount.

The calculation of the water content can be achieved, for example, by calculating the generated amount and the evaporation amount as in the above configuration.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a control device 100, which is a control device for an internal combustion engine according to a first embodiment, will be described with reference to FIGS. 1 to 10J.

Configuration of Vehicle

First, the configuration of a vehicle 10 equipped with the control device 100, which is the control device according to the first embodiment, will be described with reference to FIG. 1.

Figure 1:
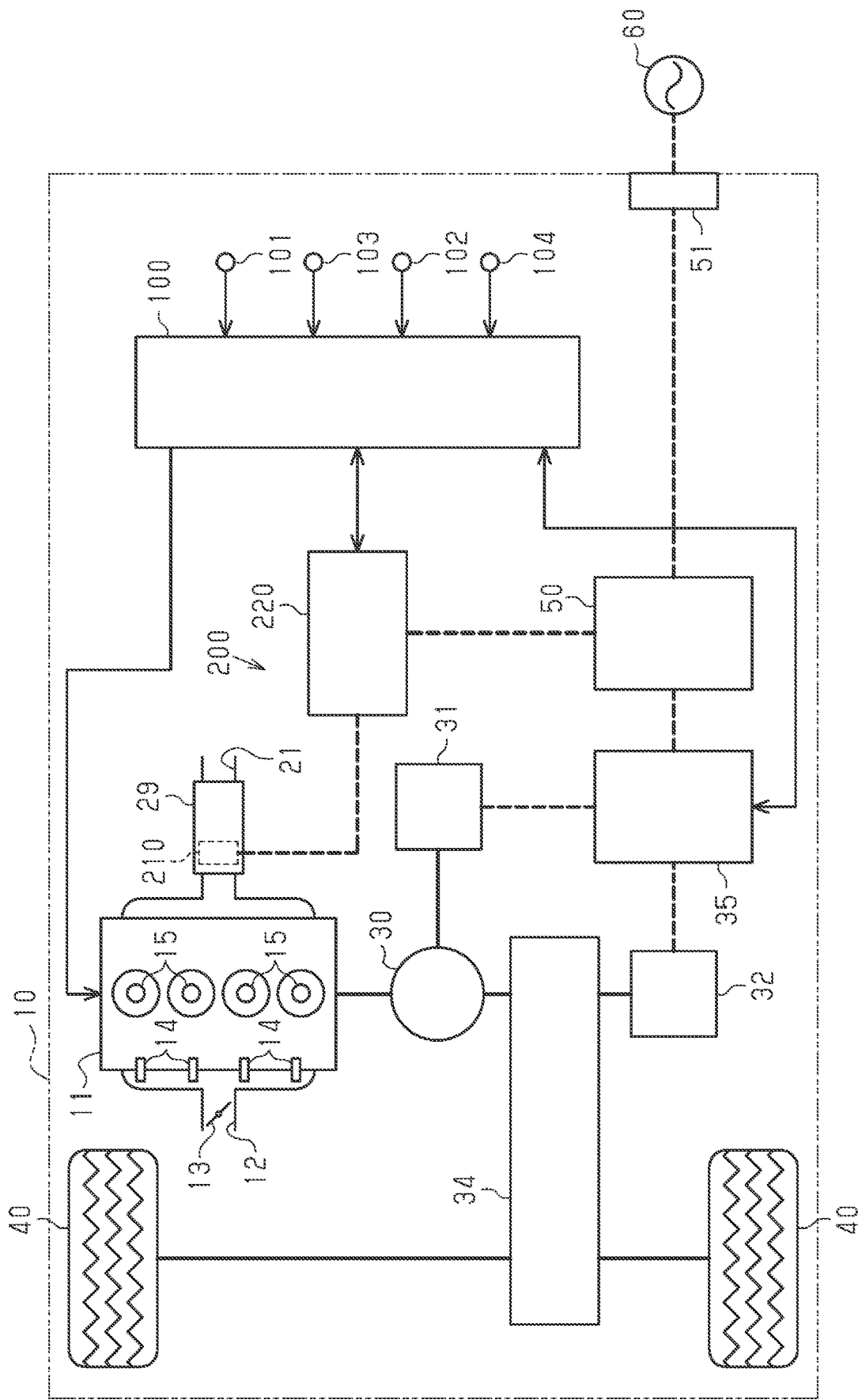
FIG. 1 is a schematic diagram showing a relationship between a control device according to a first embodiment of a control device for an internal combustion engine and a vehicle provided with the internal combustion engine controlled by the control device.

As shown in FIG. 1, the vehicle 10 includes an internal combustion engine 11 and a second motor generator 32 as power sources. That is, the vehicle 10 is a hybrid electric vehicle. Among the hybrid electric vehicles, the vehicle 10 is a plug-in hybrid electric vehicle that can be connected to an external power source 60 to charge a battery 50. A charger 51 used for external charging is therefore connected to the battery 50. The battery 50 is, for example, a high voltage battery of 400 V. The second motor generator 32 is, for example, a three-phase alternating current type motor generator.

The internal combustion engine 11 includes an intake passage 12 and an exhaust passage 21. In the example shown in FIG. 1, the internal combustion engine 11 includes four cylinders. The intake passage 12 is provided with a throttle valve 13 for adjusting the flow rate of the intake air flowing through the intake passage 12. The internal combustion engine 11 is provided with multiple fuel injection valves 14 for injecting fuel while the internal combustion engine 11 takes in the air, one of which being provided for each cylinder. Multiple fuel injection valves 14 may be provided for each cylinder, or the number of the fuel injection valves 14 provided for each cylinder may be different from each other. The internal combustion engine 11 is also provided with multiple spark plugs 15 for igniting an air-fuel mixture of fuel and intake air by spark discharge, one of which being provided for each cylinder. Multiple spark plugs 15 may be provided for each cylinder, or the number of spark plugs 15 provided for each cylinder may be different from each other.

A catalytic converter 29 is installed in the exhaust passage 21 of the internal combustion engine 11. The catalytic converter 29 is equipped with an electric heating catalyst 210 that generates heat in response to energization. The electric heating catalyst 210 is connected to the battery 50 via a power supply device 220. The detailed configuration of an electric heating catalyst system 200 including the electric heating catalyst 210 will be described later with reference to FIG. 2.

The second motor generator 32 is connected to the battery 50 via a power control unit 35. The second motor generator 32 is connected to drive wheels 40 via a reduction mechanism 34.

The internal combustion engine 11 is connected to the drive wheels 40 via a power split mechanism 30 and the reduction mechanism 34. A first motor generator 31 is also connected to the power split mechanism 30. The first motor generator 31 is, for example, a three-phase alternating current type motor generator. The power split mechanism 30 is a planetary gear mechanism, and can provide the driving force of the internal combustion engine 11 to the first motor generator 31 and the drive wheels 40.

The first motor generator 31 receives the driving force of the internal combustion engine 11 and the driving force from the drive wheels 40 to generate electric power. The first motor generator 31 also serves as a starter for driving the rotation shaft of the internal combustion engine 11 when the internal combustion engine 11 is started. At that time, the first motor generator 31 functions as a motor for generating the driving force according to the supply of electric power from the battery 50.

The first motor generator 31 and the second motor generator 32 are connected to the battery 50 via the power control unit 35. The alternating current power generated by the first motor generator 31 is converted into the direct current by the power control unit 35 and charged into the battery 50. That is, the power control unit 35 functions as an inverter.

The direct current power of the battery 50 is converted into alternating current by the power control unit 35 and supplied to the second motor generator 32. When the vehicle 10 is decelerated, the second motor generator 32 uses the driving force from the drive wheels 40 to generate electric power. The generated electric power is then charged into the battery 50. That is, in the vehicle 10, regenerative charging is performed. In this case, the second motor generator 32 functions as a generator. At this time, the alternating current power generated by the second motor generator 32 is converted into direct current by the power control unit 35 and charged into the battery 50.

When the first motor generator 31 functions as a starter, the power control unit 35 converts the direct current power of the battery 50 into alternating current and supplies this to the first motor generator 31.

Control Device

The control device 100 controls the internal combustion engine 11, the first motor generator 31, and the second motor generator 32. That is, the control device 100 is a control device that controls the powertrain of the vehicle 10 that is a plug-in hybrid electric vehicle. The control device 100 thus controls the internal combustion engine 11 including the electric heating catalyst system 200. In short, the control device 100 is also a control device that controls the internal combustion engine 11. Further, as will be described later, the control device 100 diagnoses an abnormality in the electric heating catalyst system 200. In short, the control device 100 is also an abnormality diagnosing device for diagnosing an abnormality of the electric heating catalyst system 200.

Detection signals of sensors provided in various parts of the vehicle 10 are input to the control device 100. The detection signals input to the control device 100 includes the vehicle speed, the accelerator pedal operation amount, and the state of charge SOC according to the remaining capacity of the battery 50. A coolant temperature sensor 101 for detecting the coolant temperature Tw, which is the temperature of the coolant of the internal combustion engine 11, is connected to the control device 100. A power switch 102 used by the driver of the vehicle 10 to start and stop the system of the vehicle 10 is also connected to the control device 100. The control device 100 thus grasps the activation state of the system of the vehicle 10 based on the input signal from the power switch 102. An exhaust temperature sensor 103 that detects the exhaust temperature Tex, which is the temperature of the exhaust gas discharged from the internal combustion engine 11, is connected to the control device 100. The exhaust temperature sensor 103 is disposed on the upstream side of the catalytic converter 29 in the exhaust passage 21. Further, an air flow meter 104 that detects the intake air temperature Tin, which is the temperature of the air taken into the internal combustion engine 11, and an intake air amount, which is the mass thereof, is connected to the control device 100.

The vehicle 10 configured as described above uses the electric power stored in the battery 50 to drive the second motor generator 32, whereby the vehicle 10 can perform motor traveling in which the drive wheels 40 are driven using only the second motor generator 32. The vehicle 10 can also perform hybrid traveling in which the drive wheels 40 are driven using the internal combustion engine 11 and the second motor generator 32.

Configuration of Electric Heating Catalyst System

Next, the configuration of the electric heating catalyst system 200 will be described with reference to FIG. 2.

Figure 2:
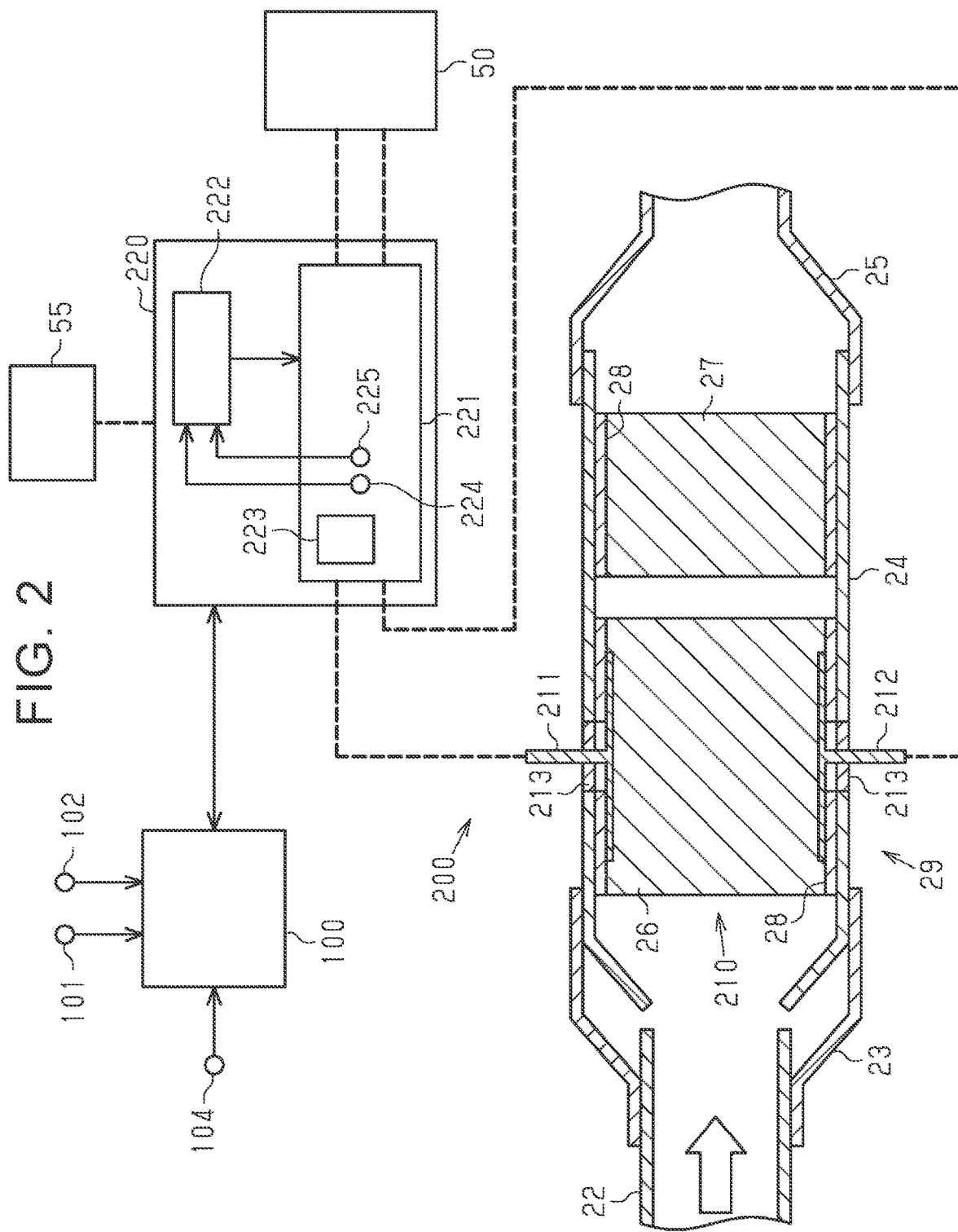
FIG. 2 is a schematic diagram showing a schematic configuration of an electric heating catalyst system mounted on the vehicle.

As shown in FIG. 2, the catalytic converter 29 is equipped with a second exhaust gas reduction catalyst 27 in addition to a first exhaust gas reduction catalyst 26 constituting the electric heating catalyst 210. Both the first exhaust gas reduction catalyst 26 and the second exhaust gas reduction catalyst 27 are catalyst carriers having a honeycomb structure in which a plurality of passages extending in the flowing direction of exhaust gas is partitioned, and in which a three-way catalyst is supported on the catalyst carrier.

The first exhaust gas reduction catalyst 26 and the second exhaust gas reduction catalyst 27 are housed in a case 24. The case 24 is a cylinder made of metal such as stainless steel. The case 24 is an exhaust pipe that constitutes a part of the exhaust passage 21. In the case 24, a mat 28 is interposed between the first exhaust gas reduction catalyst 26 and the case 24, and between the second exhaust gas reduction catalyst 27 and the case 24. The mat 28 is an insulator, and is made of, for example, an inorganic fiber containing alumina as a main component.

The mat 28 is interposed between the first exhaust gas reduction catalyst 26 and the case 24, and between the second exhaust gas reduction catalyst 27 and the case 24 in a compressed state. The first exhaust gas reduction catalyst 26 and the second exhaust gas reduction catalyst 27 are thus held in the case 24 by the restoring force of the compressed mat 28.

An upstream side connection pipe 23 having a smaller diameter toward the upstream side is covered and fixed to the upstream portion of the case 24 from the outside. Further, a downstream side connection pipe 25 having a smaller diameter toward the downstream side is covered and fixed to the downstream portion of the case 24 from the outside.

As shown in FIG. 2, the upstream side connection pipe 23 connects an upstream side exhaust pipe 22 having a diameter smaller than that of the case 24 and the case 24. Similarly, the downstream side connection pipe 25 connects an exhaust pipe on the downstream side having a diameter smaller than that of the case 24 and the case 24. As described above, the case 24 containing the first exhaust gas reduction catalyst 26 and the second exhaust gas reduction catalyst 27, the upstream side connection pipe 23, and the downstream side connection pipe 25 constitute the catalytic converter 29 that constitutes a part of the exhaust passage 21.

The diameter of the end of the case 24 on the upstream side becomes smaller closer to the upstream side exhaust pipe 22, and the diameter of the portion closest to the upstream side exhaust pipe 22 is substantially equal to the diameter of the upstream side exhaust pipe 22.

The first exhaust gas reduction catalyst 26 is located on the upstream side of the second exhaust gas reduction catalyst 27. The catalyst carrier of the first exhaust gas reduction catalyst 26 is made of a material that generates heat as an electric resistance when energized. For example, silicon carbide can be used as such a material. The catalyst carrier has a characteristic that the electric resistance becomes smaller when the temperature is high than when the temperature is low.

A first electrode 211 and a second electrode 212 are attached to the first exhaust gas reduction catalyst 26. The first electrode 211 is a positive electrode, and the second electrode 212 is a negative electrode. By applying a voltage between the first electrode 211 and the second electrode 212, a current flows through the first exhaust gas reduction catalyst 26. When an electric current flows through the first exhaust gas reduction catalyst 26, the catalyst carrier generates heat due to the electric resistance of the catalyst carrier.

The first electrode 211 and the second electrode 212 extend in the circumferential direction and the axial direction along the outer peripheral surface of the catalyst carrier in order to allow a uniform current to flow through the entire catalyst carrier. The first electrode 211 and the second electrode 212 each penetrate the case 24.

An insulator 213 made of an insulating material such as alumina is fitted between the first electrode 211 and the case 24, and between the second electrode 212 and the case 24. The inner peripheral surface of the case 24 is coated with an insulating material, whereby an insulation coat is applied. That is, the insulation coat is applied to a portion of the case 24, which is an exhaust pipe, in which the catalyst carrier is disposed. As the insulation coat, for example, a glass coat can be used. Accordingly, the first exhaust gas reduction catalyst 26 is electrically insulated from the case 24. The insulation coat has a characteristic that the electric resistance becomes smaller when the temperature is high than when the temperature is low.

As described above, the first electrode 211 and the second electrode 212 are attached to the first exhaust gas reduction catalyst 26. The first exhaust gas reduction catalyst 26 is therefore an electric heating catalyst 210 that generates heat by being supplied with electric power. Hereinafter, the electric heating catalyst 210 will be referred to as EHC 210. When the catalyst carrier generates heat by energization, the first exhaust gas reduction catalyst 26 is heated and activation is promoted.

Further, when the internal combustion engine 11 operates and the exhaust gas flows, the heat is transferred to the second exhaust gas reduction catalyst 27 by the exhaust gas that has passed through the EHC 210 and is warmed up. This also promotes warming up of the second exhaust gas reduction catalyst 27.

The first electrode 211 and the second electrode 212 are connected to the power supply device 220 by power cables. In this way, the EHC 210 is connected to the battery 50 via a power supply circuit 221 of the power supply device 220. The power supply device 220 includes the power supply circuit 221 including an insulated transistor and a power switching element, and a power supply microcomputer 222 that is a power supply control device for controlling the power supply circuit 221. The power supply circuit 221 is provided with a current sensor 224 and a voltage sensor 225. The current sensor 224 and the voltage sensor 225 are connected to the power supply microcomputer 222. The power supply microcomputer 222 detects the current supplied to the EHC 210 based on signals output by the current sensor 224. The power supply microcomputer 222 detects the voltage applied to the EHC 210 based on signals output by the voltage sensor 225. An auxiliary battery 55 is connected to the power supply device 220.

Further, the power supply circuit 221 of the power supply device 220 is provided with an electric leakage detection circuit 223 for detecting the insulation resistance Rt of the EHC 210 to detect electric leakage. For example, the electric leakage detection circuit 223 includes a reference resistance. When detecting electric leakage, electric power is supplied from the auxiliary battery 55 to the power supply circuit 221 including the electric leakage detection circuit 223. The power supply microcomputer 222 then calculates the insulation resistance Rt of the EHC 210 based on the current value and the voltage value each detected by the current sensor 224 and the voltage sensor 225 at this time. The insulation resistance Rt is the electric resistance value of the insulation coat. The electric leakage is detected based on the low insulation resistance Rt.

The power supply device 220 is connected to the control device 100 so as to be communicable with each other, and the insulation resistance Rt calculated by the power supply microcomputer 222 is output to the control device 100. The control device 100 outputs commands to the power supply device 220 to control the energization of the EHC 210 via the power supply device 220. That is, the control device 100 supplies electric power of the battery 50 to the EHC 210 via the power supply device 220.

Preheating Process

In the vehicle 10 that is a plug-in hybrid electric vehicle, if there is sufficient margin in the state of charge SOC of the battery 50, the vehicle travels in the motor traveling mode in which only the second motor generator 32 is used as the power source for traveling. The control device 100 at this time keeps the internal combustion engine 11 in a stopped state. The control device 100 controls the power control unit 35 so that the second motor generator 32 generates a torque for obtaining a driving force corresponding to the required driving force.

The control device 100 switches the traveling mode of the vehicle 10 from the motor traveling mode to the hybrid traveling mode when the state of charge SOC of the battery 50 falls below a certain value during traveling in the motor traveling mode. The hybrid traveling mode is a traveling mode in which both the internal combustion engine 11 and the second motor generator 32 are used as power sources for traveling.

In order to be able to exhibit sufficient exhaust gas reduction capacity immediately after switching to the hybrid traveling mode, the EHC 210 is desirably energized before shifting to the hybrid traveling mode and starting the internal combustion engine 11 to warm up the first exhaust gas reduction catalyst 26.

The control device 100 therefore executes a preheating process for warming up the first exhaust gas reduction catalyst 26 by energizing the EHC 210 with the electric power of the battery 50 prior to the start of the internal combustion engine 11.

If the preheating process is performed in a state where water is adhered to the catalyst carrier of the first exhaust gas reduction catalyst 26, the catalyst carrier may crack. That is, heat is taken away by the latent heat of vaporization until the adhered water evaporates and disappears. The temperature of the portion to which water is adhered therefore does not easily rise. On the other hand, the temperature of the portion to which water is not adhered continues to rise due to the heat generated by the energization during that period. As a result, when energization is continued, the temperature difference ΔT between the portion to which water is adhered and the portion to which water is not adhered increases.

Figure 3:
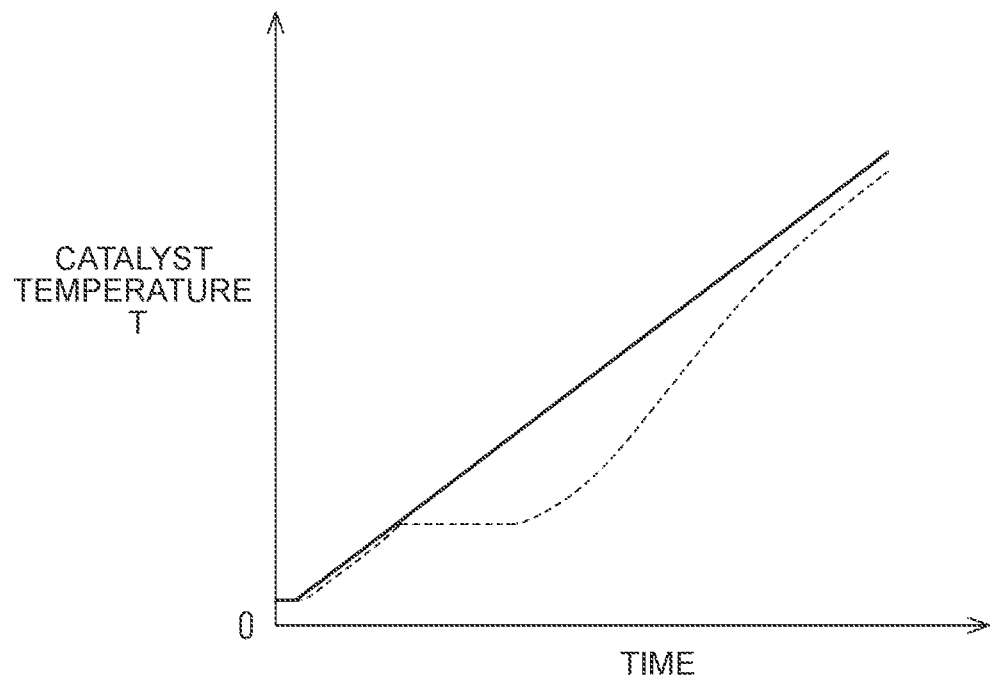
FIG. 3 is a graph showing a temperature change of a portion of a catalyst carrier to which water is not adhered and a temperature change of the portion to which water is adhered.

FIG. 3 shows a change in the catalyst temperature T that is the temperature of the first exhaust gas reduction catalyst 26 due to the preheating process. The solid line in FIG. 3 shows the change in the catalyst temperature T of the portion of the catalyst carrier of the first exhaust gas reduction catalyst 26 to which water is not adhered. The dashed line in FIG. 3 shows the change in the catalyst temperature T of the portion of the catalyst carrier of the first exhaust gas reduction catalyst 26 to which water is adhered.

As shown by the dashed line in FIG. 3, when the catalyst temperature T of the portion to which water is adhered rises, the water tends to evaporate. Since heat is taken away by the heat of vaporization while the water is evaporating, the catalyst temperature T does not rise as shown by the dashed line in FIG. 3 even when the energization is continued if the water is actively evaporated.

Figure 4:
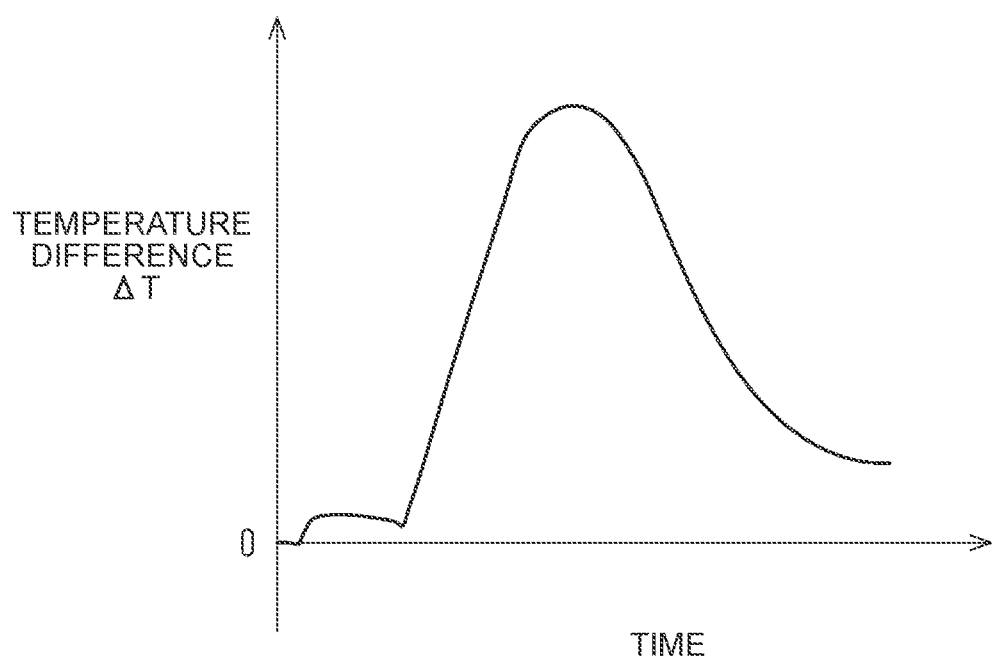
FIG. 4 is a graph showing a change in the temperature difference $\Delta T$ between the portion of the catalyst carrier to which water is not adhered and the portion to which water is adhered.

As shown by the solid line in FIG. 3, the catalyst temperature T of the portion to which water is not adhered continues to rise during this period. As a result, as shown in FIG. 4, during this period, the temperature difference ΔT between the portion of the catalyst carrier to which water is adhered and the portion to which water is not adhered increases, and thermal stress acts on the catalyst carrier.

Therefore, if the EHC 210 is continuously energized by the preheating process with water adhered, the temperature difference ΔT becomes too large and the thermal stress becomes large. If the thermal stress becomes too large, the catalyst carrier may crack.

Therefore, in the control device 100 of the first embodiment, when it is determined that water is adhered to the catalyst carrier, the internal combustion engine 11 is started without executing the preheating process, and the exhaust gas is used to remove the water adhering to the catalyst carrier.

Routine for Prohibiting Preheating Process

Next, a routine for prohibiting the preheating process will be described with reference to FIG. 5.

This routine is executed by the control device 100 when the power switch 102 is operated from OFF to ON, the control device 100 is activated, and the system of the vehicle 10 is in operation.

Figure 5:
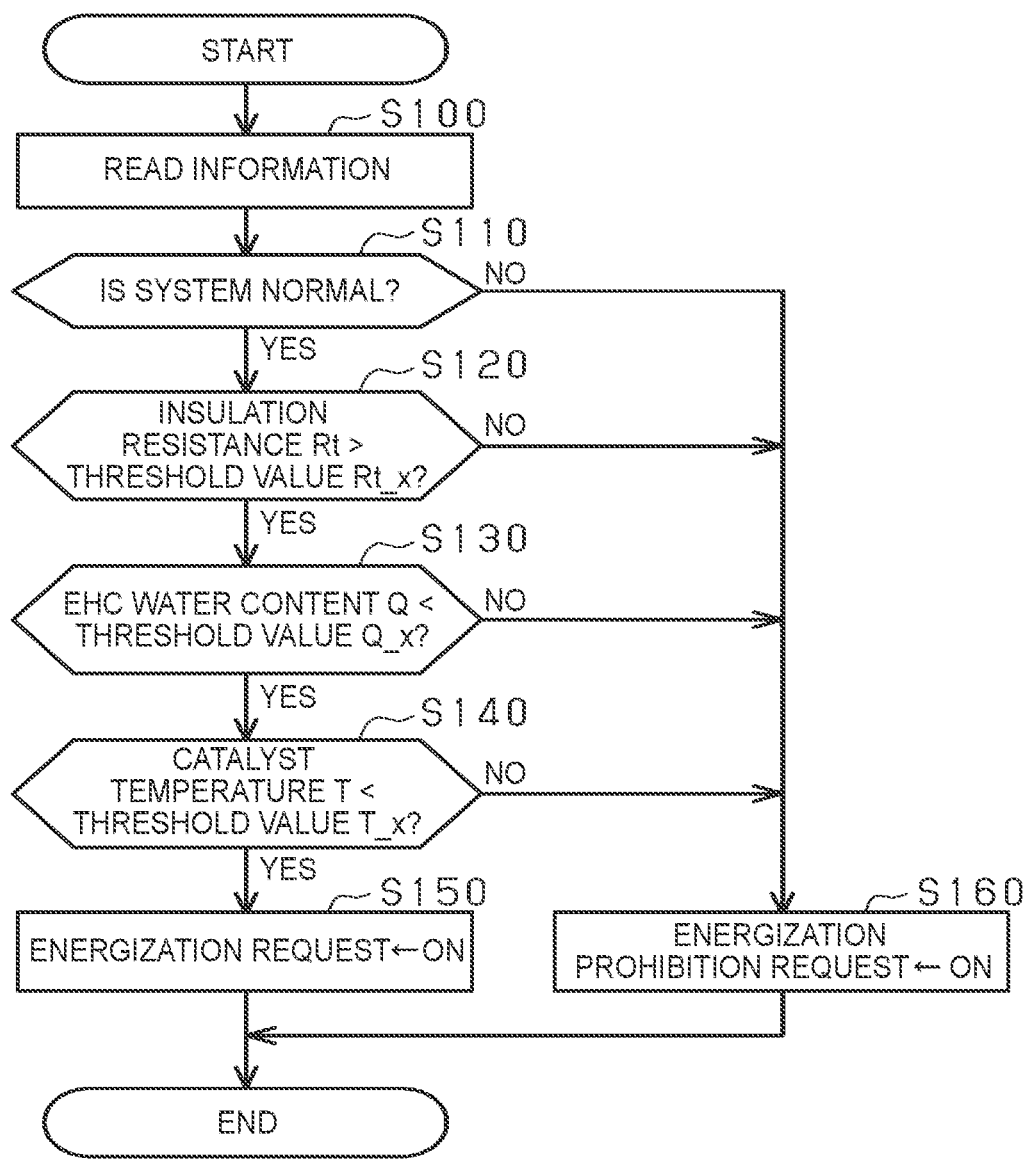
FIG. 5 is a flowchart showing a flow of processing in a routine for prohibiting a preheating process executed by the control device.

As shown in FIG. 5, when this routine is started, the control device 100 first reads information for confirming the state of the system in the process of step S100. Specifically, the control device 100 reads information indicating the result of the abnormality diagnosis process that has already been performed. That is, in the vehicle 10, an abnormality diagnosis process for diagnosing an abnormality in each part of the vehicle 10 is performed during driving. When the control device 100 makes a diagnosis that an abnormality has occurred in the abnormality diagnosis process, the control device 100 stores a flag indicating that the abnormality has occurred. In the process of step S100, the control device 100 reads the information of this flag. For example, such a flag includes a flag indicating an abnormality of the internal combustion engine 11, a flag indicating an abnormality of the power supply device 220, and the like.

Further, in the process of step S100, the control device 100 reads information on the water content Q that is an estimated value of the amount of water present in the catalyst carrier of the first exhaust gas reduction catalyst 26. The calculation of the water content Q will be described later with reference to FIGS. 6 to 7. Further, the control device 100 reads the catalyst temperature T and the insulation resistance Rt of the EHC 210 in the process of step S100. The catalyst temperature T read here is an estimated value of the temperature of the first exhaust gas reduction catalyst 26 calculated by the control device 100.

When the operation of the internal combustion engine 11 is stopped, the control device 100 stores the catalyst temperature T at that time as the stop temperature Toff and starts the soak timer. The control device 100 continues measuring the time by the soak timer while the internal combustion engine 11 is stopped. The control device 100 obtains a difference by subtracting the stop temperature Toff from the outside air temperature at the start of the internal combustion engine 11, and calculates the product of the difference and the convergence rate. The sum obtained by adding the product to the stop temperature Toff is calculated. The sum calculated in this way is defined as the catalyst temperature T at the engine start. The convergence rate is calculated based on the soak time. The convergence rate is a value from zero to one. The convergence rate becomes closer to one as the soak time increases. For example, when the convergence rate is one, the catalyst temperature T is equal to the outside air temperature. This indicates that when the convergence rate is one, the catalyst temperature T has converged to the outside air temperature. The control device 100 regards the intake air temperature Tin detected by the air flow meter 104 as the outside air temperature and uses it for calculating the catalyst temperature T.

During engine operation, the control device 100 calculates the temperature change amount dT. The control device 100 then calculates the latest catalyst temperature T by adding the temperature change amount dT to the catalyst temperature T calculated immediately before. The temperature change amount dT changes under the influence of exhaust heat. Therefore, the control device 100 calculates the temperature change amount dT using parameters that affect the heat energy amount of the exhaust gas such as the engine rotation speed NE, the engine load, the coolant temperature Tw, the intake air amount, and the intake air temperature Tin.

Further, in the vehicle 10, when the system is started, the power supply microcomputer 222 detects the insulation resistance Rt by using the electric leakage detection circuit 223 as described above. As described above, at this time, the electric power of the auxiliary battery 55 is supplied to the EHC 210 to detect the insulation resistance Rt. The control device 100 also reads the insulation resistance Rt detected when the system is started in the process of step S100.

In the process of the next step S110, the control device 100 determines whether the system of the vehicle 10 is normal. Specifically, in the process of step S110, the control device 100 determines whether the system of the vehicle 10 is normal based on the flag indicating the result of the abnormality diagnosis process read in the process of step S100. That is, when the flag indicating that an abnormality has occurred is stored, the control device 100 determines that the system is not normal. On the other hand, when the flag indicating that an abnormality has occurred is not stored, the control device 100 determines that the system is normal.

When it is determined in the process of step S110 that the system is normal (step S110: YES), the control device 100 advances the process to step S120. In the process of step S120, the control device 100 determines whether the insulation resistance Rt read in the process of step S100 is larger than the threshold value Rt_x. The threshold value Rt_x is a threshold value for determining that the electric resistance of the insulation coat is large enough to suppress electric leakage based on the fact that the insulation resistance Rt is larger than the threshold value Rt_x.

When it is determined in the process of step S120 that the insulation resistance Rt is larger than the threshold value Rt_x (step S120: YES), the control device 100 advances the process to step S130.

In the process of step S130, the control device 100 determines whether water is adhered to the catalyst carrier of the first exhaust gas reduction catalyst 26. Specifically, the control device 100 determines whether the water content Q of the EHC 210 is smaller than the threshold value Q_x. The threshold value Q_x is a threshold value for determining that the water content Q is small enough to the extent that a large thermal stress causing the catalyst carrier to crack does not act even when the preheating process is performed, based on the fact that the water content Q is smaller than the threshold value Q_x.

As described with reference to FIGS. 3 and 4, the temperature difference $\Delta T$ increases and the thermal stress increases until the water adhering to the catalyst carrier evaporates and disappears. Accordingly, when the water content Q is small, the water evaporates completely before a large thermal stress causing the catalyst carrier to crack is generated, and the temperature difference $\Delta T$ is eliminated. Therefore, when the water content Q is small enough, the thermal stress causing the catalyst carrier to crack does not occur even when the preheating process is performed. That is, when the water content Q is small enough, it can be considered that water causing cracking by performing the preheating process is not adhered to the catalyst carrier. The size of the threshold value Q_x is set by the result of an experiment performed in advance or a calculation based on the specifications of the catalyst carrier.

When the control device 100 determines in the process of step S130 that the water content Q is smaller than the threshold value Q_x (step S130: YES), the control device 100 determines that water is not adhered to the catalyst carrier based on this result. The control device 100 then advances the process to step S140.

The control device 100 determines in the process of step S140 whether the temperature of the first exhaust gas reduction catalyst 26 is lower than the activation temperature. Specifically, the control device 100 determines whether the catalyst temperature T read in the process of step S100 is lower than the threshold value T_x. The threshold value T_x is the activation temperature.

When the control device 100 determines in the process of step S140 that the catalyst temperature T is lower than the threshold value T_x (step S140: YES), the control device 100 determines that the temperature of the first exhaust gas reduction catalyst 26 is lower than the activation temperature based on this result. The control device 100 then advances the process to step S150.

In the process of step S150, the control device 100 turns ON the energization request to the EHC 210. The control device 100 then ends this routine.

When the energization request is turned ON, the control device 100 starts the preheating process. In the preheating process, the control device 100 continues to energize the EHC 210 until the electric power amount, which is the integrated value of the input electric power, reaches the target electric power amount. Accordingly, the first exhaust gas reduction catalyst 26 is heated to the activation temperature or higher to warm up. The target electric power amount is set based on the electric power amount required to heat the first exhaust gas reduction catalyst 26 until the warm-up is completed. The electric power amount is an integrated value of the electric power actually supplied to the EHC 210.

In the preheating process, the control device 100 controls the power supply circuit 221 to convert the voltage of the battery 50 to supply electric power to the EHC 210. When the temperature of the first exhaust gas reduction catalyst 26 rises due to the preheating process, the electric resistance of the EHC 210 gradually decreases accordingly. Therefore, the control device 100 lowers the voltage in accordance with the decrease in the electric resistance to maintain the input electric power at a constant electric power. Further, the control device 100 controls the voltage within a range equal to or lower than the upper limit voltage so that the voltage does not exceed the value of the preset upper limit voltage. That is, the upper limit voltage is the upper limit value of the voltage when controlling the voltage in the preheating process. When energization is started, the control device 100 reads the current value detected by the current sensor 224 and the voltage value detected by the voltage sensor 225, and starts integrating the input electric power. While the EHC 210 is energized, the control device 100 integrates the input electric power and continues to calculate the electric power amount input to the EHC 210.

The control device 100 determines whether the calculated electric power amount has reached the target electric power amount. When it is determined that the electric power amount has reached the target electric power amount, the energization of the EHC 210 is terminated. That is, the control device 100 continues energization from the battery 50 until the electric power amount reaches the target electric power amount. Then, when the electric power amount reaches the target electric power amount, the control device 100 ends the preheating process by ending the energization from the battery 50.

When the preheating process is completed, the control device 100 permits the start of the internal combustion engine 11 and starts the internal combustion engine 11. When it is determined in the process of step S110 in the routine of FIG. 5 that the system of the vehicle 10 is not normal (step S110: NO), the control device 100 advances the process to step S160. Also, when the control device 100 determines in the process of step S120 that the insulation resistance Rt is equal to or lower than the threshold value Rt_x (step S120: NO), the process proceeds to step S160. The control device 100 turns ON the energization prohibition request in the process of step S160. The control device 100 then ends this routine. That is, when there is an abnormality in the system or when sufficient insulation resistance Rt cannot be secured, the control device 100 prohibits energization of the EHC 210 and does not execute the preheating process.

Also, when the control device 100 determines in the process of step S130 that the water content Q of the EHC 210 is equal to or larger than the threshold value Q_x (step S130: NO), the process proceeds to step S160. The control device 100 turns ON the energization prohibition request in the process of step S160. The control device 100 then ends this routine. That is, also when it is determined that water is adhered to the catalyst carrier of the first exhaust gas reduction catalyst 26, the control device 100 prohibits energization of the EHC 210 and does not execute the preheating process. This is because, as described above, if the preheating process is performed in a state where water is adhered to the catalyst carrier of the first exhaust gas reduction catalyst 26, the catalyst carrier may crack.

Also, when the control device 100 determines in the process of step S140 that the catalyst temperature T is equal to or higher than the threshold value T_x (step S140: NO), the process proceeds to step S160. The control device 100 turns ON the energization prohibition request in the process of step S160. The control device 100 then ends this routine. That is, when it is not determined that the temperature of the first exhaust gas reduction catalyst 26 is lower than the activation temperature, the control device 100 prohibits energization of the EHC 210 and does not execute the preheating process. This is because it is not necessary to warm up the first exhaust gas reduction catalyst 26 by the preheating process.

When the energization prohibition request is ON, the control device 100 does not energize the EHC 210 even when the energization request to the EHC 210 is turned ON. The energization prohibition request is reset to OFF when the evaporation promotion control described later is completed.

When the energization of the EHC 210 is prohibited in this way, the control device 100 permits the start of the internal combustion engine 11 and starts the internal combustion engine 11. The control when the internal combustion engine 11 is started with the execution of the preheating process prohibited will be described later with reference to FIG. 9 for the catalyst warm-up control.

Calculation of Water Content Q

Next, the calculation of the water content Q will be described with reference to FIGS. 6 to 8.

Figure 6:
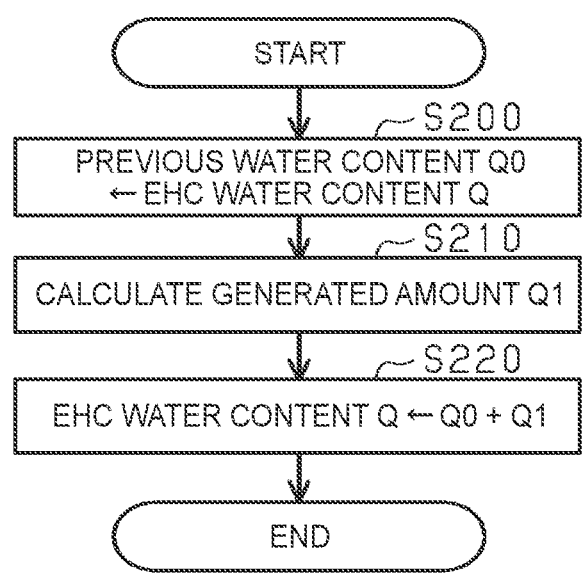
FIG. 6 is a flowchart showing a flow of processing for calculating water content Q, which is executed when the control device is activated.

The flowchart of FIG. 6 shows a flow of processing in a routine executed by the control device 100 when the power switch 102 is turned ON and the control device 100 is started.

As shown in FIG. 6, when this routine is started, the control device 100 first substitutes the water content Q stored in the storage device into the previous water content Q0 in the process of step S200. Note that FIG. 7 shows a flow of processing in a routine executed by the control device 100 when the power switch 102 is turned OFF and the control device 100 is stopped.

Figure 7:
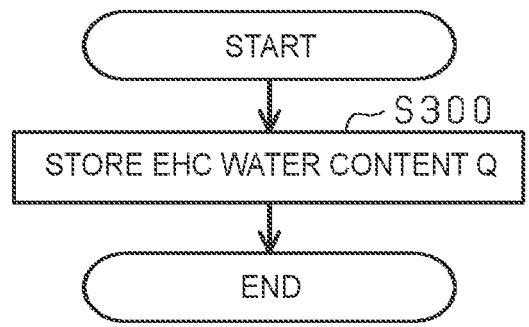
FIG. 7 is a flowchart showing a storage process of the water content Q, which is executed when the control device is stopped.

As shown in FIG. 7, the control device 100 executes the process of step S300 until the power switch 102 is turned OFF and stopped, and stores the water content Q calculated at that time in the storage device. That is, the water content Q substituted into the previous water content Q0 in the process of step S200 of FIG. 6 is the value of the water content Q stored in the storage device through the process of step S300 of FIG. 7 when the control device 100 is stopped.

When the previous water content Q0 is updated through the process of step S200 in FIG. 6, the control device 100 advances the process to step S210. The control device 100 then calculates the generated amount Q1 in the process of step S210. The generated amount Q1 is the amount of condensed water generated in the catalyst carrier of the first exhaust gas reduction catalyst 26 while the power switch 102 is turned OFF and the system of the vehicle 10 is stopped.

In the process of step S210, the control device 100 calculates the generated amount Q1 based on, for example, the coolant temperature Tw when the power switch 102 is turned OFF and the system is stopped, the current coolant temperature Tw, and the outside air temperature. The condensed water is more likely to be generated as the catalyst carrier having a high temperature is cooled suddenly. The control device 100 therefore calculates the generated amount Q1 so that the generated amount Q1 increases as the coolant temperature Tw when the system is stopped increases and as the current coolant temperature Tw decreases. Since the condensed water is more likely to be generated as the outside air temperature is lower, the generated amount Q1 is calculated so that the generated amount Q1 increases as the outside air temperature decreases. The calculation of the generated amount Q1 in step S210, can be achieved, for example, by inputting the coolant temperature Tw when the system is stopped, the current coolant temperature Tw, and the outside air temperature to a calculation map created based on the result of an experiment performed in advance, and outputting the generated amount Q1. The calculation of the generated amount Q1 can also be achieved by inputting the coolant temperature Tw when the system is stopped, the current coolant temperature Tw, and the outside air temperature to a calculation formula adapted in advance, and outputting the generated amount Q1, without using the calculation map.

When the generated amount Q1 is calculated through the process of step S210, the control device 100 advances the process to step S220. In the process of step S220, the control device 100 adds the generated amount Q1 to the previous water content Q0 and substitutes the sum into the water content Q. When the generated amount Q1 is added to the previous water content Q0 to calculate the water content Q, the control device 100 ends this routine.

Figure 8:
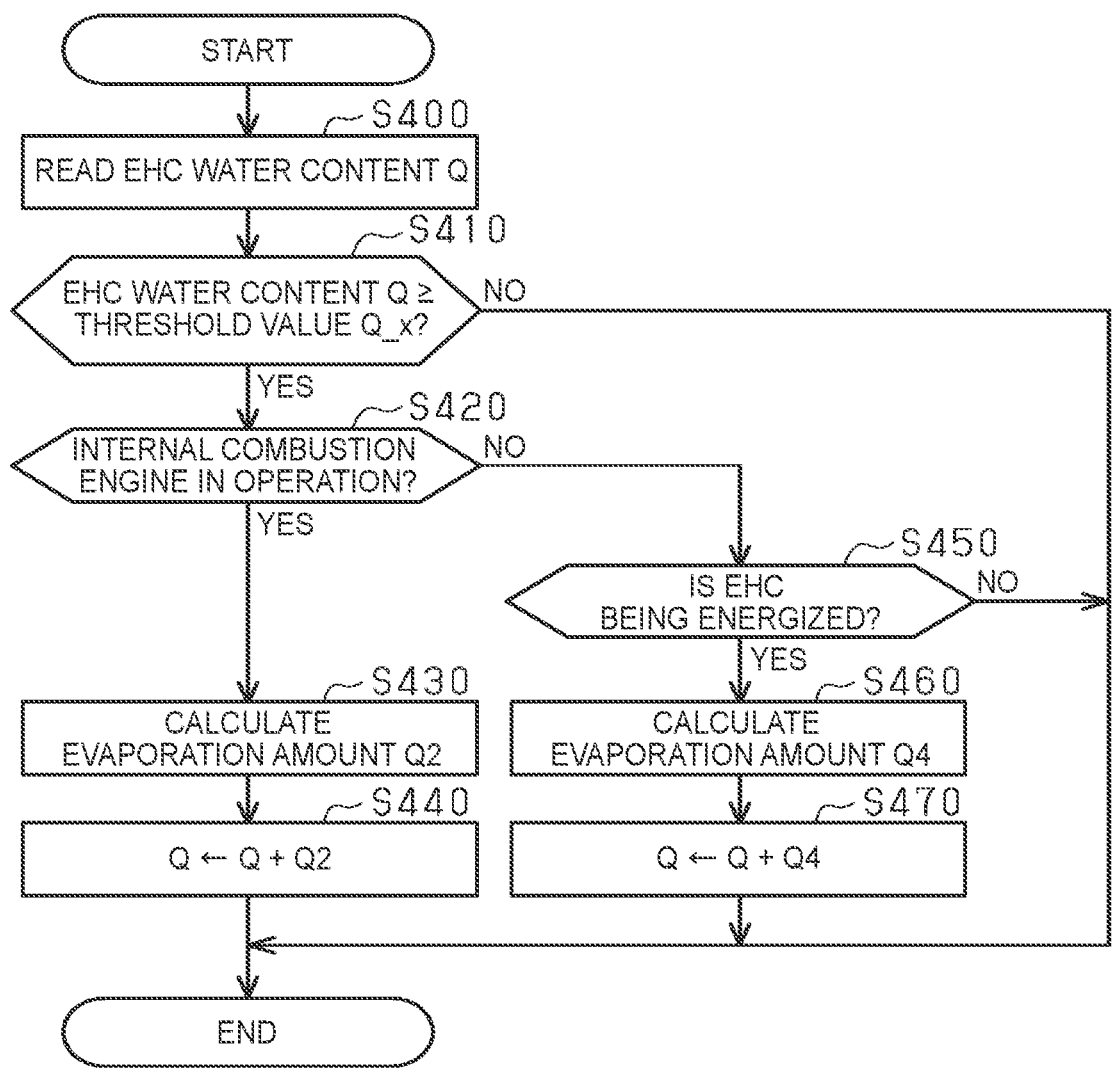
FIG. 8 is a flowchart showing a flow of a water content update process executed by the control device during catalyst warm-up.

FIG. 8 shows a flow of processing in a routine that is repeatedly executed by the control device 100 while the system of the vehicle 10 is in operation and until the catalyst warm-up control is completed. This routine is a routine for updating the water content Q by incorporating the amount of water evaporated from the catalyst carrier of the first exhaust gas reduction catalyst 26 due to the catalyst warm-up control during system operation. In the control device 100, it is determined that the catalyst warm-up control is completed when the preheating process is completed or when the catalyst warm-up by the exhaust heat described later is completed. Further, the control device 100 considers that the catalyst warm-up control has already been completed when the catalyst temperature T at the time of system startup is equal to or higher than the threshold value T_x.

When this routine is started, the control device 100 first reads the water content Q in the process of step S400. Since this routine is executed repeatedly, the value of the water content Q read here is the water content Q updated by executing this routine last time. The value of the water content Q read when this routine is executed for the first time after the system is started is the water content Q calculated through the process of step S220 in FIG. 6 when the system is started.

When the water content Q is read in the process of step S400, the control device 100 advances the process to step S410. The control device 100 then determines whether the water content Q is equal to or larger than the threshold value Q_x in the process of step S410. The threshold value Q_x is the same value as the threshold value Q_x used in the process of step S130 in FIG. 5.

When it is determined in the process of step S410 that the water content Q is equal to or larger than the threshold value Q_x (step S410: YES), the control device 100 advances the process to step S420. In the process of step S420, the control device 100 determines whether the internal combustion engine 11 is in operation.

When it is determined in the process of step S420 that the internal combustion engine 11 is in operation (step S420: YES), the control device 100 advances the process to step S430. The control device 100 then calculates the evaporation amount Q2 in the process of step S430. The evaporation amount Q2 is a value indicating an amount at which the water content Q is reduced by evaporation. Here, the evaporation amount Q2 is calculated as a negative value. That is, the larger the amount by which the water content Q is reduced by evaporation, the larger the absolute value of the evaporation amount Q2.

The control device 100 calculates the evaporation amount Q2 based on the exhaust temperature Tex detected by the exhaust temperature sensor 103 in the process of step S430. Specifically, the evaporation amount Q2 is calculated using a calculation map that stores the relationship between the exhaust temperature Tex, which is the input, and the evaporation amount Q2, which is the output. This calculation map is created based on the results of experiments and the like performed in advance. For example, in this calculation map, as the exhaust temperature Tex increases, the output absolute value of the evaporation amount Q2 becomes a larger negative value. That is, in this calculation map, the higher the exhaust temperature Tex, the smaller the value of the output evaporation amount Q2.

When the evaporation amount Q2 is calculated through the process of step S430, the control device 100 advances the process to step S440. In the process of step S440, the control device 100 adds the evaporation amount Q2 calculated in the process of step S430 to the water content Q, and substitutes the sum into the water content Q. That is, in the process of step S440, the control device 100 updates the water content Q by adding the evaporation amount Q2 to the water content Q. When the water content Q is updated in this way, the control device 100 temporarily terminates this routine. The lower limit of the water content Q is zero.

On the other hand, when it is determined in the process of step S420 that the internal combustion engine 11 is not in operation (step S420: NO), the control device 100 advances the process to step S450. The control device 100 determines whether the EHC 210 is being energized in the process of step S450.

When it is determined in the process of step S450 that the EHC 210 is being energized (step S450: YES), the control device 100 advances the process to step S460. The control device 100 then calculates the evaporation amount Q4 in the process of step S460. Similarly to the evaporation amount Q2, the evaporation amount Q4 is also a value indicating the amount at which the water content Q is reduced by evaporation. The evaporation amount Q4 is also calculated as a negative value. That is, the larger the amount by which the water content Q is reduced by evaporation, the larger the absolute value of the evaporation amount Q4.

In the process of step S460, the control device 100 calculates, for example, the quotient obtained by dividing the electric power input to the EHC 210 by the latent heat of vaporization of water as the evaporation amount Q4. That is, the larger the input electric power, the larger the evaporation amount Q4. As long as the EHC 210 has just started to be energized and the temperature of the EHC 210 is low, the decrease in water due to evaporation does not start. Accordingly, the control device 100 estimates the temperature of the EHC 210 based on the electric resistance of the EHC 210 estimated from the values of the current and the voltage when the EHC 210 is energized. When the estimated temperature of the EHC 210 is a temperature at which water does not decrease, the evaporation amount Q4 is set to zero.

When the evaporation amount Q4 is calculated through the process of step S460, the control device 100 advances the process to step S470. In the process of step S470, the control device 100 adds the evaporation amount Q4 calculated in the process of step S460 to the water content Q, and substitutes the sum into the water content Q. That is, in the process of step S470, the control device 100 updates the water content Q by adding the evaporation amount Q4 to the water content Q. When the water content Q is updated in this way, the control device 100 temporarily terminates this routine.

When it is determined in the process of step S450 that the EHC 210 is not being energized (step S450: NO), the control device 100 temporarily terminates this routine as it is. That is, in this case, the evaporation amount Q4 is not calculated and the water content Q is not updated.

When it is determined in the process of step S410 that the water content Q is smaller than the threshold value Q_x (step S410: NO), the control device 100 terminates this routine as it is. That is, also in this case, the water content Q is not updated. This is because when the water content Q is smaller than the threshold value Q_x, it is not necessary to prohibit the preheating process, and it is not necessary to calculate the evaporation amount to update the water content Q.

When the above processes are not necessary in this way, the routine is designed so as not to calculate the evaporation amount or update the water content Q, so that the calculation load of the control device 100 can be reduced.

Figure 9:
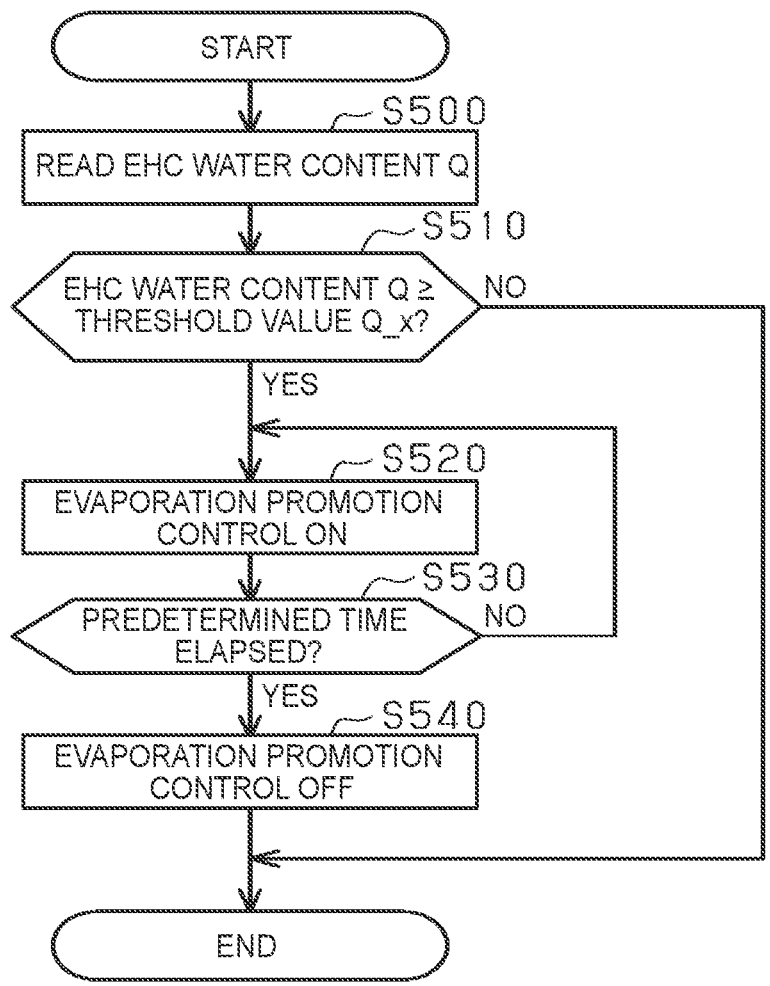
FIG. 9 is a flowchart showing a flow of a series of processes related to evaporation promotion control executed by the control device during catalyst warm-up.
Figure 10:
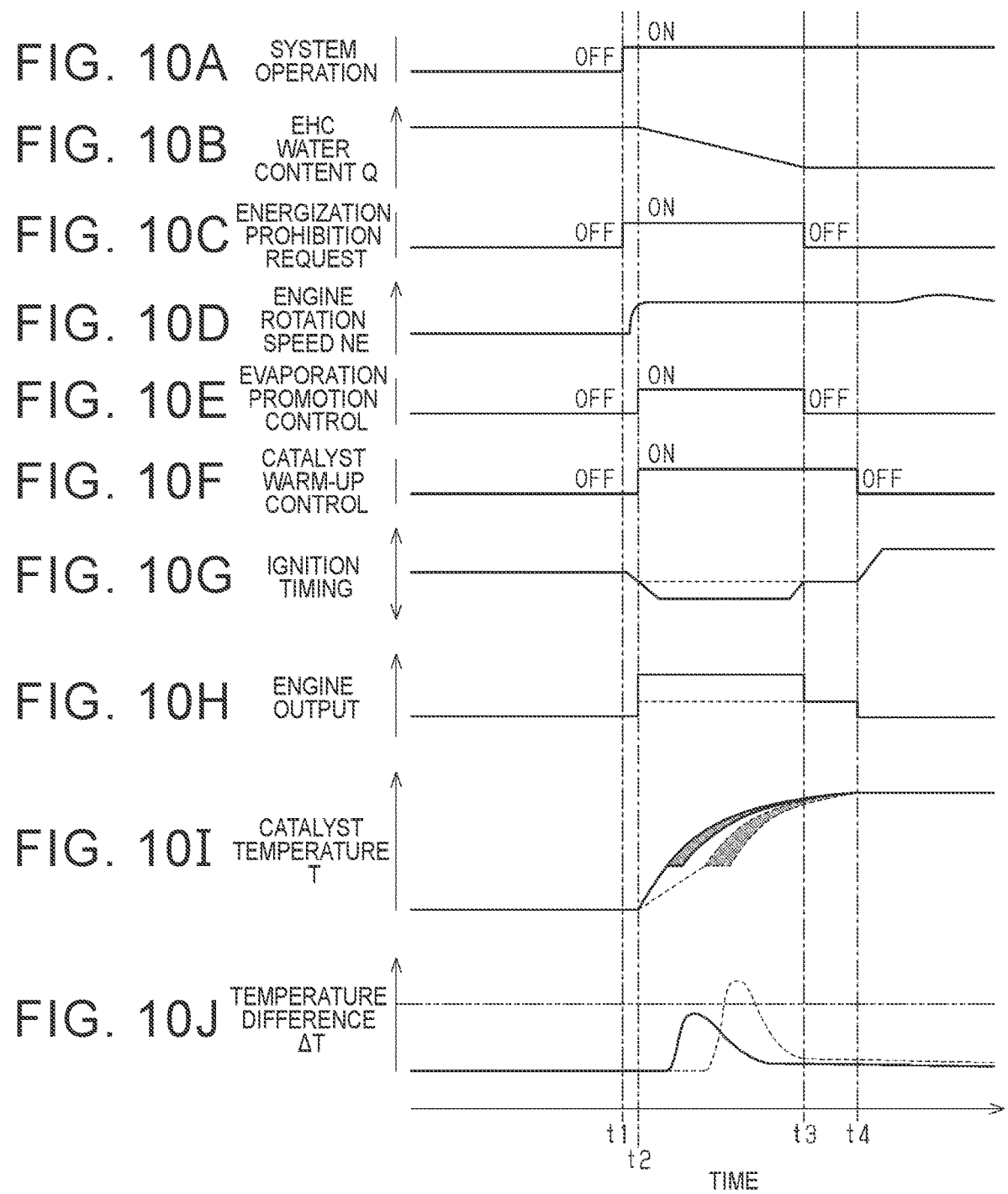
FIG. 10A is a time chart showing changes in the operating state of a system when the system of the vehicle is started with water adhered to the catalyst carrier.
FIG. 10B is a time chart showing changes in EHC water content Q when the system of the vehicle is started with water adhered to the catalyst carrier.
FIG. 10C is a time chart showing changes in an energization prohibition request when the system of the vehicle is started with water adhered to the catalyst carrier.
FIG. 10D is a time chart showing changes in an engine rotation speed NE when the system of the vehicle is started with water adhered to the catalyst carrier.
FIG. 10E is a time chart showing changes in evaporation promotion control when the system of the vehicle is started with water adhered to the catalyst carrier.
FIG. 10F is a time chart showing changes in catalyst warm-up control when the system of the vehicle is started with water adhered to the catalyst carrier.
FIG. 10G is a time chart showing changes in an ignition timing when the system of the vehicle is started with water adhered to the catalyst carrier.
FIG. 10H is a time chart showing changes in engine power when the system of the vehicle is started with water adhered to the catalyst carrier.
FIG. 10I is a time chart showing changes in catalyst temperature T when the system of the vehicle is started with water adhered to the catalyst carrier.
FIG. 10J is a time chart showing changes in temperature difference $\Delta T$ when the system of the vehicle is started with water adhered to the catalyst carrier.

Next, the catalyst warm-up control in the state where the energization prohibition request is ON will be described with reference to FIG. 9. In the control device 100, when the energization prohibition request is ON, the EHC 210 is not energized as described above. That is, the preheating process is not executed. At this time, the internal combustion engine 11 is started without executing the preheating process, and the catalyst warm-up control for warming up by utilizing the heat of the exhaust gas is executed. The routine shown in FIG. 9 is executed by the control device 100 when the catalyst warm-up control is being executed under the condition that the energization prohibition request is ON.

When the internal combustion engine 11 is started and this routine is started, the control device 100 first reads the water content Q in the process of step S500. Then, in the process of the next step S510, it is determined whether the water content Q is equal to or larger than the threshold value Q_x. The threshold value Q_x is the same value as the threshold value Q_x used in the process of step S130 in FIG. 5.

When it is determined in the process of step S510 that the water content Q is equal to or larger than the threshold value Q_x (step S510: YES), the control device 100 advances the process to step S520. Then, in the process of step S520, the control device 100 starts the evaporation promotion control.

The evaporation promotion control is control for increasing the temperature of the exhaust gas and the flow rate of the exhaust gas in order to promote the evaporation of the water contained in the catalyst carrier of the first exhaust gas reduction catalyst 26. In the evaporation promotion control, the control device 100, for example, retards the ignition timing as compared with the case where the evaporation promotion control is not executed. By retarding the ignition timing, combustion becomes slower and the temperature of the exhaust gas rises. Further, the control device 100 increases the fuel injection amount as compared with the case where the evaporation promotion control is not executed to increase the output of the internal combustion engine 11. This makes it possible to compensate for the decrease in output due to the retardation of the ignition timing. Further, the flow rate of the exhaust gas can be increased to increase the amount of heat input to the water adhering to the catalyst carrier and the catalyst carrier per unit time.

Next, in the process of step S530, the control device 100 determines whether a predetermined time has elapsed since the evaporation promotion control was started. This process is a process for determining whether the removal of water from the catalyst carrier by the catalyst warm-up control accompanied by the evaporation promotion control is completed. Therefore, the length of the predetermined time, which is the threshold value, is set to a length so that it can be regarded that water can be sufficiently removed from the catalyst carrier of the first exhaust gas reduction catalyst 26 based on the elapse of the predetermined time from the start of the evaporation promotion control. For example, the length of the predetermined time is set based on the result of an experiment or the like performed in advance. It should be noted that the larger the water content Q is, the longer the predetermined time, which is the threshold value, may be.

When it is determined in the process of step S530 that the predetermined time has not elapsed since the evaporation promotion control was started (step S530: NO), the control device 100 repeats the process of step S520. On the other hand, when it is determined in the process of step S530 that the predetermined time has elapsed since the evaporation promotion control was started (step S530: YES), the process proceeds to the next step S540. The control device 100 then ends the evaporation promotion control in the process of step S540. That is, the control device 100 ends the retardation of the ignition timing and the increase of the fuel injection amount for promoting the evaporation of water. In other words, when the water content Q is equal to or larger than the threshold value Q_x, the control device 100 executes the catalyst warm-up control by engine operation accompanied by the evaporation promotion control for a predetermined time. When the process of step S540 is completed, the control device 100 ends this routine.

When the control device 100 determines in the process of step S510 that the water content Q is smaller than the threshold value Q_x (step S510: NO), the control device 100 ends the routine without executing the processes of steps S520 to S540. That is, in this case, the control device 100 warms up the catalyst by the heat of the exhaust gas due to the normal operation of the internal combustion engine 11 without executing the evaporation promotion control.

Operation of First Embodiment

Next, the operation of the control device 100 will be described with reference to FIGS. 10A to 10J. FIGS. 10A to 10J are time charts showing changes in various states in the catalyst warm-up control when the system of the vehicle 10 is operated in a state where the water content Q is equal to or larger than the threshold value Q_x.

As shown in FIG. 10A, when the power switch 102 of the vehicle 10 is turned ON at time t1 and the system is operated, the routine described with reference to FIG. 5 is executed. In the example shown in FIG. 10B, the water content Q is large, and is equal to or larger than the threshold value Q_x. Therefore, as shown in FIG. 10C, the energization prohibition request is turned ON. Accordingly, the internal combustion engine 11 is started without executing the preheating process. Then, as shown in FIG. 10D, the engine rotation speed NE increases.

When the start of the internal combustion engine 11 is completed at time t2, the routine described with reference to FIG. 9 is executed, and the catalyst warm-up control accompanied by the evaporation promotion control is started as shown in FIGS. 10E and 10F.

Due to the evaporation promotion control, the ignition timing is retarded as shown in FIG. 10G. In FIG. 10G, the ignition timing when the evaporation promotion control is not executed is shown by a dashed line for comparison. Further, due to the evaporation promotion control, the fuel injection amount is increased and the engine output is increased as shown in FIG. 10H. In FIG. 10H, the engine output when the evaporation promotion control is not executed is shown by a dashed line for comparison.

As shown in FIG. 10I, the catalyst temperature T of the first exhaust gas reduction catalyst 26 rises due to the catalyst warm-up control by the engine operation accompanied by the evaporation promotion control. In FIG. 10I, the catalyst temperature T when the catalyst warm-up control accompanied by the evaporation promotion control is executed is shown by a solid line. For comparison, in FIG. 10I, the catalyst temperature T when the catalyst warm-up control is executed by normal engine operation without executing the evaporation promotion control is shown by a dashed line. Further, in FIG. 10I, the catalyst temperature T of the portion to which water is not adhered and the catalyst temperature T of the portion to which water is adhered are each shown. In the portion to which water is adhered, heat is taken away by the latent heat of vaporization of water. The catalyst temperature T of the portion to which water is adhered therefore does not easily rise. On the other hand, the catalyst temperature T of the portion to which water is not adhered continues to rise due to the heat generated by the energization during that period. Therefore, in FIG. 10I, the line indicating the catalyst temperature T is divided into two from a certain point partway through. That is, the lower line shows the catalyst temperature T of the portion to which water is adhered, and the upper line shows the catalyst temperature T of the portion to which water is not adhered.

As shown in FIG. 10B, the water content Q gradually decreases due to the evaporation of water as the catalyst temperature T rises while the catalyst warm-up control is being executed. At this time, as shown in FIG. 10J, the temperature difference ΔT, which is the difference between the catalyst temperature T of the portion of the catalyst carrier to which water is adhered and the catalyst temperature T of the portion to which water is not adhered, gradually increases. Accordingly, thermal stress acts on the catalyst carrier. The larger the temperature difference ΔT, the larger the thermal stress. In FIG. 10J, the temperature difference ΔT at which the catalyst carrier cracks is shown by a long dashed double-short dashed line.

As shown by the dashed lines in FIGS. 10I and 10J, when the evaporation promotion control is not performed, the temperature difference ΔT exceeds the level shown by the long dashed double-short dashed line. This is because the amount of heat input to the first exhaust gas reduction catalyst 26 by the exhaust gas is insufficient, it takes time to evaporate and remove the water, and the temperature difference ΔT becomes too large during that time.

On the other hand, when the catalyst warm-up control accompanied by the evaporation promotion control is executed as in the control device 100, the amount of heat input to the first exhaust gas reduction catalyst 26 by the exhaust gas is increased. Therefore, water is removed in a shorter period of time as compared with the example shown by the dashed lines. As a result, as shown by the solid line in FIG. 10J, the temperature difference ΔT does not exceed the level shown by the long dashed double-short dashed line.

When it is determined at time t3 that a predetermined time has elapsed from the start of the evaporation promotion control, the evaporation promotion control is stopped. This stops the retardation of the ignition timing and the increase in the fuel injection amount. At this time, as shown in FIG. 10B, the water content Q is almost zero. After that, the catalyst warm-up control ends at time t4.

Effect of First Embodiment (1-1) As described above, the control device 100 determines whether water is adhered to the catalyst carrier through the process of step S130, which is a determination process. When the control device 100 determines that water is adhered to the catalyst carrier, the control device 100 starts the internal combustion engine 11 without executing the preheating process even when the temperature of the first exhaust gas reduction catalyst 26 is determined to be lower than the activation temperature. The water adhering to the catalyst carrier is thus removed by using the exhaust gas.

In the case of the preheating process in which the catalyst carrier is heated by energization, heat is transferred from the catalyst carrier to the water adhering to the catalyst carrier. In addition, when the internal combustion engine 11 is operating and the exhaust gas is passing through the first exhaust gas reduction catalyst 26, heat is also applied to the water adhering to the catalyst carrier from the exhaust gas flowing around. The water therefore evaporates quickly. The temperature of the exhaust gas is higher than the temperature of the catalyst carrier that is heated by the preheating process. The catalyst carrier is also warmed by the heat of the exhaust gas. Therefore, the temperature difference ΔT between the portion to which water is adhered and the portion to which water is not adhered is less likely to occur as compared with the case where the preheating process is performed in which the catalyst carrier is heated only by energization. That is, according to the control device 100, the thermal stress generated in the catalyst carrier can be suppressed. As a result, it is possible to suppress the catalyst carrier from cracking due to thermal stress.

(1-2) Since the catalyst warm-up control is performed without executing the preheating process only when the water content Q is large, deterioration of the exhaust property can be suppressed.

(1-3) When it is determined that water is adhered to the catalyst carrier, the control device 100 prohibits energization of the catalyst carrier. Therefore, energization is not performed in a state where water may be adhered to the catalyst carrier. This makes it possible to more reliably suppress cracking of the catalyst carrier from occurring due to the thermal stress generated by the energization as compared with the case where the energization is not prohibited.

(1-4) When the internal combustion engine 11 is started without executing the preheating process based on the determination that water is adhered to the catalyst carrier, the control device 100 retards the ignition timing compared to when the internal combustion engine 11 is started after executing the preheating process. By performing engine operation with the retarded ignition timing, the exhaust temperature Tex increases. Therefore, according to the control device 100, the temperature of the exhaust gas passing through the catalyst carrier can be raised, and the removal of water and the warming up of the first exhaust gas reduction catalyst 26 can be completed promptly.

(1-5) When the internal combustion engine 11 is started without executing the preheating process based on the determination that water is adhered to the catalyst carrier, the control device 100 increases the fuel injection amount compared to when the internal combustion engine 11 is started after executing the preheating process. By increasing the fuel injection amount, the engine rotation speed NE is increased. As the engine rotation speed NE increases, the flow rate of the exhaust gas passing through the catalyst carrier increases, and the heat generated by combustion increases. Accordingly, the amount of heat applied to the water adhering to the catalyst carrier and the catalyst carrier per unit time increases. Therefore, it is possible to quickly complete the removal of water and the warming up of the exhaust gas reduction catalyst.

Second Embodiment

In the control device 100 of the first embodiment, when the water content Q is equal to or larger than the threshold value Q_x (step S130: NO), energization to the EHC 210 is prohibited. However, when the water content Q is equal to or larger than the threshold value Q_x, the control device 100 according to the second embodiment does not execute the preheating process and energizes the EHC 210 while operating the internal combustion engine 11 to remove the water in the catalyst carrier and warm up the catalyst. That is, the control device 100 of the second embodiment is different from the control device 100 of the first embodiment in that the control device 100 of the second embodiment does not prohibit energization of the EHC 210 even when the water content Q is equal to or larger than the threshold value Q_x.

Figure 11:
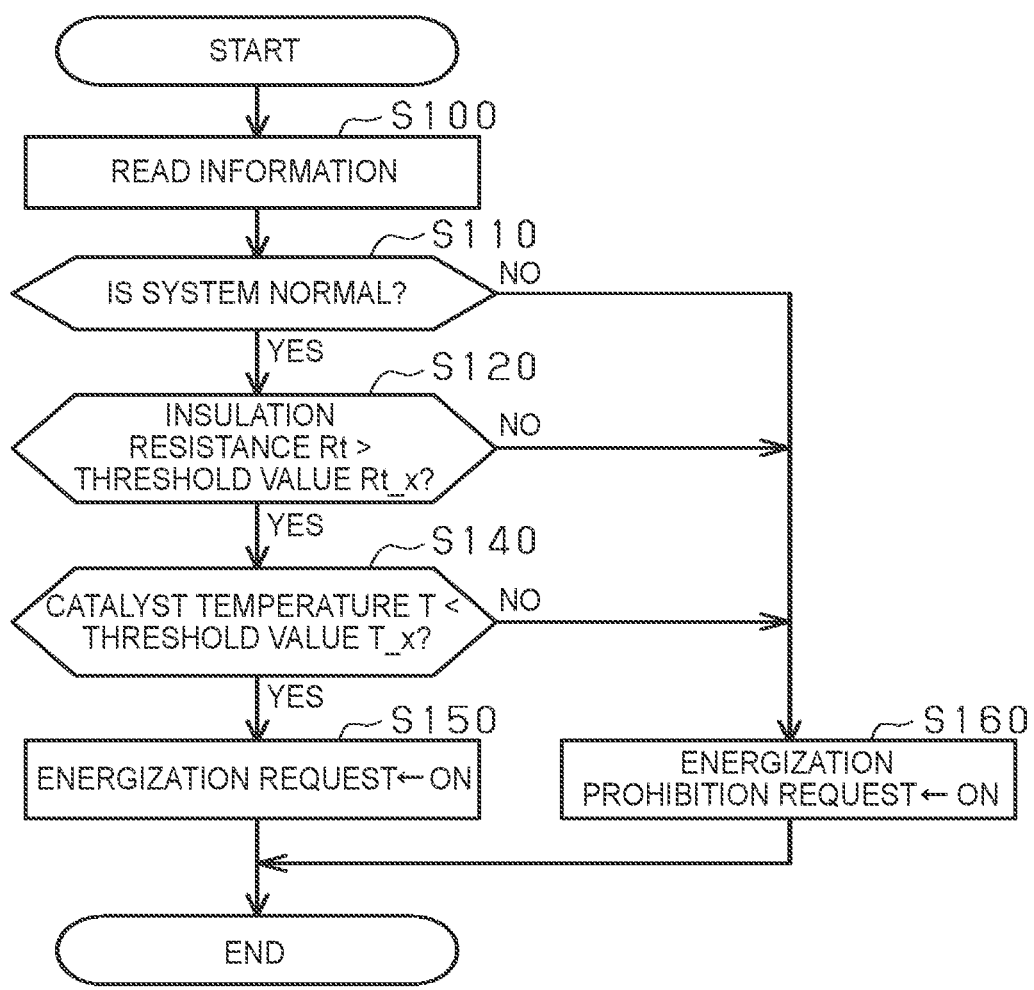
FIG. 11 is a flowchart showing a flow of processing in a routine for prohibiting a preheating process executed by the control device according to a second embodiment.

FIG. 11 shows a flow of processing of a routine executed by the control device 100 in the second embodiment instead of the routine shown in FIG. 5. In FIG. 11, the same processing as that in FIG. 5 is designated by the same reference numerals.

This routine is executed by the control device 100 when the power switch 102 is operated from OFF to ON, the control device 100 is activated, and the system of the vehicle 10 is in operation.

As shown in FIG. 11, when this routine is started, the control device 100 first reads information for confirming the state of the system in the process of step S100. In the process of step S100, the information of the water content Q is also read as in the first embodiment. The water content Q is also calculated in the second embodiment through the same process as the calculation process in the first embodiment described with reference to FIGS. 6 to 8.

In the process of the next step S110, the control device 100 determines whether the system of the vehicle 10 is normal. When it is determined in the process of step S110 that the system is normal (step S110: YES), the control device 100 advances the process to step S120. In the process of step S120, the control device 100 determines whether the insulation resistance Rt read in the process of step S100 is larger than the threshold value Rt_x.

When it is determined in the process of step S120 that the insulation resistance Rt is larger than the threshold value Rt_x (step S120: YES), the control device 100 advances the process to step S140.

The control device 100 determines in the process of step S140 whether the temperature of the first exhaust gas reduction catalyst 26 is lower than the activation temperature. When the control device 100 determines in the process of step S140 that the catalyst temperature T is lower than the threshold value T_x (step S140: YES), the control device 100 determines that the temperature of the first exhaust gas reduction catalyst 26 is lower than the activation temperature based on this result. The control device 100 then advances the process to step S150.

In the process of step S150, the control device 100 turns ON the energization request to the EHC 210. The control device 100 then ends this routine. When the energization request is turned ON, the control device 100 starts the preheating process. When the preheating process is completed, the control device 100 permits the start of the internal combustion engine 11 and starts the internal combustion engine 11.

When it is determined in the process of step S110 in the routine of FIG. 11 that the system of the vehicle 10 is not normal (step S110: NO), the control device 100 advances the process to step S160. Also when the control device 100 determines in the process of step S120 that the insulation resistance Rt is equal to or lower than the threshold value Rt_x (step S120: NO), the process proceeds to step S160.

The control device 100 turns ON the energization prohibition request in the process of step S160. The control device 100 then ends this routine. That is, when there is an abnormality in the system or when sufficient insulation resistance Rt cannot be secured, the control device 100 prohibits energization of the EHC 210 and does not execute the preheating process.

Also when the control device 100 determines in the process of step S140 that the catalyst temperature T is equal to or higher than the threshold value T_x (step S140: NO), the process proceeds to step S160. The control device 100 turns ON the energization prohibition request in the process of step S160. The control device 100 then ends this routine. That is, when it is not determined that the temperature of the first exhaust gas reduction catalyst 26 is lower than the activation temperature, the control device 100 prohibits energization of the EHC 210 and does not execute the preheating process.

Figure 12:
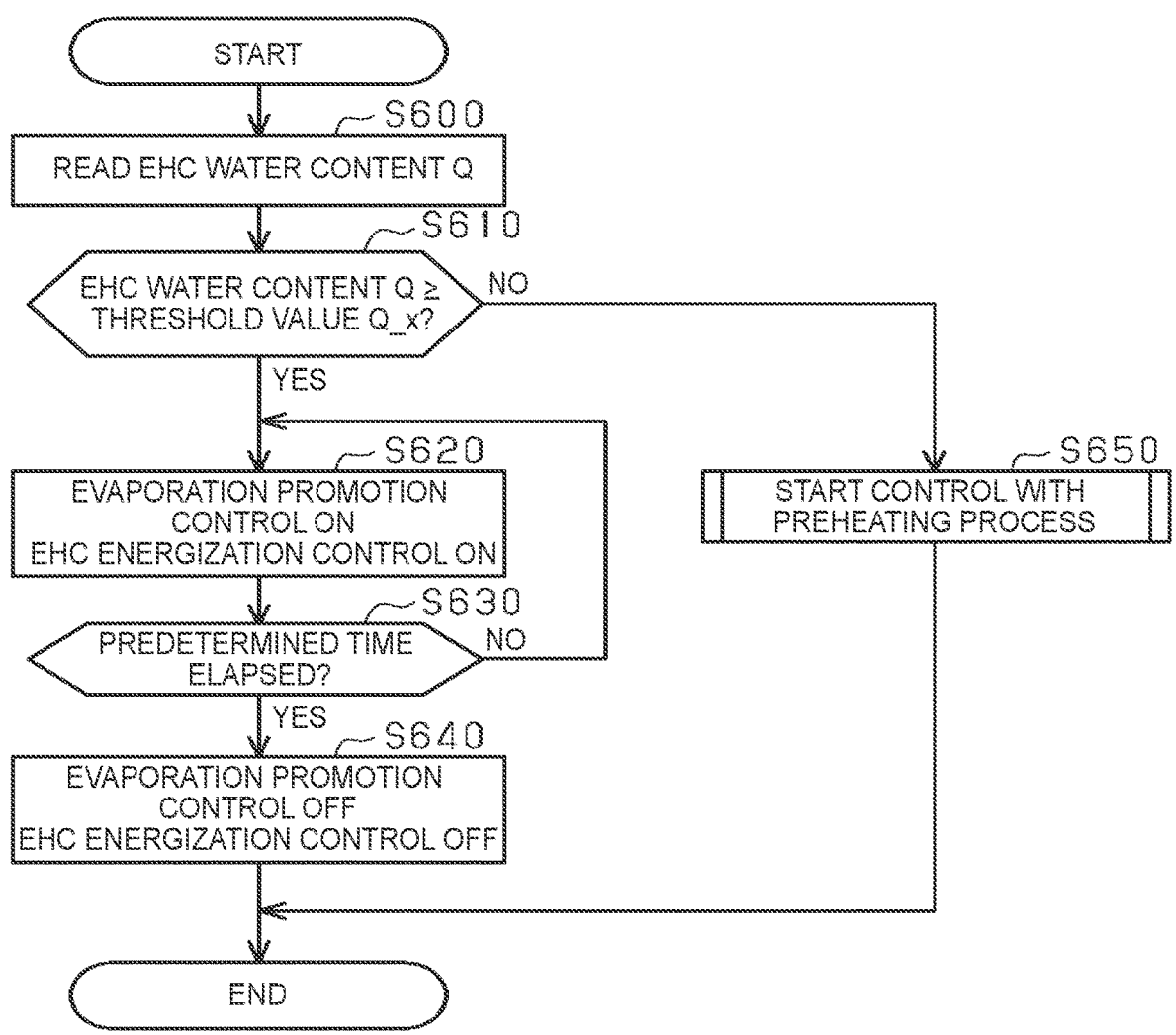
FIG. 12 is a flowchart showing a flow of processing related to catalyst warm-up control executed by the control device according to the second embodiment.

Next, the catalyst warm-up control will be described with reference to FIG. 12. The routine shown in FIG. 12 is executed by the control device 100 when the start of the internal combustion engine 11 is requested while the temperature of the first exhaust gas reduction catalyst 26 is determined to be lower than the activation temperature.

When this routine is started, the control device 100 first reads the water content Q in the process of step S600. Then, in the process of the next step S610, it is determined whether the water content Q is equal to or larger than the threshold value Q_x. The threshold value Q_x is the same value as the threshold value Q_x used in the process of step S130 in FIG. 5. In the control device 100 of the second embodiment, the process of step S620 corresponds to a determination process of determining whether water is adhered to the catalyst carrier.

When it is determined in the process of step S610 that the water content Q is equal to or larger than the threshold value Q_x (step S610: YES), the control device 100 advances the process to step S620. Then, in the process of step S620, the control device 100 starts the internal combustion engine 11 and starts the evaporation promotion control. Further, in step S620, the control device 100 also executes energization control of the EHC 210 in a state where the start of the internal combustion engine 11 is completed and the exhaust gas is flowing in the exhaust passage 21. That is, in the control device 100 of the second embodiment, the catalyst warm-up control is executed by heating the EHC 210 by energization in addition to the heating by the exhaust gas. The content of the evaporation promotion control is the same as that of the first embodiment.

Next, in the process of step S630, the control device 100 determines whether a predetermined time has elapsed since the evaporation promotion control was started. This process is a process for determining whether the removal of water from the catalyst carrier is completed. Therefore, the length of the predetermined time, which is the threshold value, is set to a length so that it can be regarded that water can be sufficiently removed from the catalyst carrier of the first exhaust gas reduction catalyst 26 based on the elapse of the predetermined time from the start of the evaporation promotion control. For example, the length of the predetermined time is set based on the result of an experiment or the like performed in advance. It should be noted that the larger the water content Q is, the longer the predetermined time, which is the threshold value, may be.

When it is determined in the process of step S630 that the predetermined time has not elapsed since the evaporation promotion control was started (step S630: NO), the control device 100 repeats the process of step S620. On the other hand, when it is determined in the process of step S630 that the predetermined time has elapsed since the evaporation promotion control was started (step S630: YES), the process proceeds to the next step S640. The control device 100 then ends the evaporation promotion control and the energization control of the EHC 210 in the process of step S640. That is, when the water content Q is equal to or larger than the threshold value Q_x, the control device 100 executes catalyst warm-up control by engine operation accompanied by evaporation promotion control while executing energization control of the EHC 210 for a predetermined time. When the process of step S640 is completed in this way, the control device 100 ends this routine.

Further, when the control device 100 determines in the process of step S610 that the water content Q is smaller than the threshold value Q_x (step S610: NO), the control device 100 advances the process to step S650.

In the process of step S650, the control device 100 executes the start control with the preheating process. That is, in this case, the control device 100 executes the preheating process for executing energization control of the EHC 210 prior to starting the internal combustion engine 11. When the catalyst warm-up is completed by the preheating process, the internal combustion engine 11 is started. When the process of step S650 is completed, the control device 100 ends this routine.

Operation of Second Embodiment

In the control device 100 of the second embodiment, based on the determination that water is adhered to the catalyst carrier by the determination process (step S610: YES), the internal combustion engine is started without executing the preheating process. Then, the evaporation promotion control is executed and the EHC 210 is energized (step S630). In this way, both the heat generated by the energization and the heat of the exhaust gas are used to warm up the first exhaust gas reduction catalyst 26.

Effect of Second Embodiment

According to the control device 100 of the second embodiment, the same effects as those of the effects (1-1), (1-2), (1-4), and (1-5) in the first embodiment can be obtained. The following effect can be obtained in place of the effect (1-3) in the first embodiment.

(2-3) When the internal combustion engine 11 is in operation and the exhaust gas is passing through the catalyst carrier, heat is also applied to the water adhering to the catalyst carrier from the exhaust gas, which makes it easier for the water to evaporate. Therefore, cracking of the catalyst carrier due to thermal stress is less likely to occur. In the control device 100 of the second embodiment, after the internal combustion engine 11 is started without executing the preheating process, the EHC 210 is energized while the internal combustion engine 11 is operated. Accordingly, the warm-up of the first exhaust gas reduction catalyst 26 can be completed quickly while suppressing the cracking of the catalyst carrier.

The first and the second embodiments above can be modified and implemented as follows. The above embodiments and modification examples described below may be carried out in combination of each other within a technically consistent range.

The method for calculating the water content Q is not limited to the illustrated method, and can be appropriately changed. For example, only the generated amount Q1, which is the amount of water generated in the catalyst carrier while the internal combustion engine 11 is stopped, may be calculated, and the value may be regarded as the water content Q.

The requirements for determining whether water is adhered to the catalyst carrier can be changed as appropriate. For example, it is not always necessary to calculate the water content Q to make the determination. For example, it may be determined that water is generated in the catalyst carrier when the outside air temperature is extremely low and the coolant temperature Tw is extremely low.

The content of the evaporation promotion control can be changed as appropriate. For example, only one of the control for retarding the ignition timing and the control for increasing the fuel injection amount may be executed.

The evaporation promotion control may be omitted.

The temperature of the first exhaust gas reduction catalyst 26 may be detected by a sensor in order to determine that the temperature of the first exhaust gas reduction catalyst 26 is lower than the activation temperature.

It may be determined that the temperature of the first exhaust gas reduction catalyst 26 is lower than the activation temperature based on the coolant temperature Tw detected by the coolant temperature sensor 101 being lower than the threshold value. If the warm-up of the internal combustion engine 11 is completed and the coolant temperature Tw is sufficiently high, it can be considered that the engine operation is sufficiently continued. It can thus be considered that the first exhaust gas reduction catalyst 26 is sufficiently warmed by the exhaust gas and its temperature is equal to or higher than the activation temperature. The coolant temperature Tw is maintained at a high temperature for a while after the operation of the internal combustion engine 11 is stopped, but the coolant temperature Tw gradually decreases as the state in which the internal combustion engine 11 is stopped continues. Further, if the state in which the internal combustion engine 11 is stopped continues, the temperature of the first exhaust gas reduction catalyst 26 gradually decreases. Therefore, when the coolant temperature Tw is low, it can be considered that the temperature of the first exhaust gas reduction catalyst 26 is also low and the temperature thereof is lower than the activation temperature. In this case, the threshold value to be compared with the coolant temperature Tw is set by the result of an experiment performed in advance or a calculation based on the specifications of the catalyst carrier.

The energization prohibition request may be reset to OFF when the power switch 102 is turned OFF and the system of the vehicle 10 is stopped. Further, the energization prohibition request may be reset to OFF when the water content Q becomes sufficiently low. For example, the energization prohibition request may be reset to OFF when the water content Q becomes smaller than the threshold value Q_x.

The internal combustion engine 11 may be a spark-ignition type internal combustion engine or a compression ignition type internal combustion engine.

The configuration of the catalytic converter 29 can be changed as appropriate. For example, the configuration may be such that the second exhaust gas reduction catalyst 27 is not provided.

The catalyst supported on the catalyst carrier of the exhaust gas reduction catalyst is not limited to the three-way catalyst, and may be, for example, an oxidation catalyst, a storage reduction NOx catalyst, or a selective reduction NOx catalyst.

The vehicle 10 on which the electric heating catalyst system 200 and the control device 100 are mounted is not limited to a plug-in hybrid electric vehicle, and may be a hybrid electric vehicle without the plug-in function or a vehicle powered only by the internal combustion engine 11. In the example of these vehicles other than the plug-in hybrid electric vehicle, the energization request of the EHC 210 is turned ON when there is a start request of the internal combustion engine 11 and the temperature of the EHC 210 becomes equal to or lower than a predetermined value.

The control device 100 can be configured as one or more processors that execute various processes according to a computer program (software), one or more dedicated hardware circuits such as an application-specific integrated circuit (ASIC) that executes at least a part of the various processes, and the like. Further, the control device 100 can also be configured as circuitry including a combination of these. The processor includes a central processing unit (CPU) and a memory such as a random access memory (RAM) and a read-only memory (ROM), and the memory stores a program code or a command configured to cause the CPU to execute processes. The memory, that is, a computer readable medium includes any available medium accessible by a general purpose or dedicated computer.

An example is shown in which the control device of the internal combustion engine is embodied as the control device 100 for controlling the powertrain of the vehicle 10. Alternatively, the control device of the internal combustion engine may be configured as a control device dedicated for controlling the internal combustion engine 11.

What is claimed is:

1. A control device for an internal combustion engine,
    the control device being applied to an internal combustion engine equipped with an electric heating catalyst system provided with an electric heating catalyst in which a catalyst carrier is heated by energizing the catalyst carrier, the electric heating catalyst being an exhaust gas reduction catalyst in which a catalyst is supported on the catalyst carrier that generates heat by energization, the catalyst carrier separated from a case of the electric heating catalyst system by an insulating mat, and
    the control device
        executes a preheating process to warm up the exhaust gas reduction catalyst prior to a start of the internal combustion engine by controlling a power supply device to supply electric power to the electric heating catalyst, when the control device determines that a temperature of the exhaust gas reduction catalyst is lower than an activation temperature,
        executes a determination process for determining whether water is adhered to the catalyst carrier, and
        starts the internal combustion engine without executing the preheating process when the control device determines by the determination process that water is adhered to the catalyst carrier, even when the control device determines that the temperature of the exhaust gas reduction catalyst is lower than the activation temperature.

2. The control device according to claim 1, wherein when the control device determines by the determination process that water is adhered to the catalyst carrier, the control device prohibits energization of the catalyst carrier.

3. The control device according to claim 1, wherein the control device starts the internal combustion engine without executing the preheating process, and then energizes the catalyst carrier based on a determination by the determination process that water is adhered to the catalyst carrier.

4. The control device according to claim 1, wherein when the internal combustion engine is started without executing the preheating process based on a determination by the determination process that water is adhered to the catalyst carrier, the control device retards an ignition timing compared to when the internal combustion engine is started after executing the preheating process.

5. The control device according to claim 1, wherein when the internal combustion engine is started without executing the preheating process based on a determination by the determination process that water is adhered to the catalyst carrier, the control device increases a fuel injection amount compared to when the internal combustion engine is started after executing the preheating process.

6. The control device according to claim 1, wherein
    the control device calculates a calculated water content that is an amount of water contained in the catalyst carrier, and
    in the determination process, the control device determines that water is adhered to the catalyst carrier when the calculated water content is equal to or larger than a threshold value, and determines that water is not adhered to the catalyst carrier when the calculated water content is smaller than the threshold value.

7. A control device for an internal combustion engine,
    the control device being applied to an internal combustion engine equipped with an electric heating catalyst system provided with an electric heating catalyst in which a catalyst carrier is heated by energizing the catalyst carrier, the electric heating catalyst being an exhaust gas reduction catalyst in which a catalyst is supported on the catalyst carrier that generates heat by energization, and
    the control device being a control device that executes a preheating process to warm up the exhaust gas reduction catalyst prior to a start of the internal combustion engine by controlling a power supply device to supply electric power to the electric heating catalyst, when the control device determines that a temperature of the exhaust gas reduction catalyst is lower than an activation temperature, wherein the control device
        calculates a calculated water content that is an amount of water contained in the catalyst carrier,
        executes a determination process for determining that water is adhered to the catalyst carrier when the calculated water content is equal to or larger than a threshold value, and determines that water is not adhered to the catalyst carrier when the calculated water content is smaller than the threshold value,
        starts the internal combustion engine without executing the preheating process when the control device determines by the determination process that water is adhered to the catalyst carrier, even when the control device determines that the temperature of the exhaust gas reduction catalyst is lower than the activation temperature,
        calculates a generated amount that is an amount of water generated in the catalyst carrier while the internal combustion engine is stopped, and
        calculates an evaporation amount that is an amount of water that evaporates in the catalyst carrier while the internal combustion engine is operating and an amount of water that evaporates in the catalyst carrier due to energization of the catalyst carrier, and
    wherein the calculated water content is based on the generated amount and the evaporation amount.

\* \* \* \* \*